(12) United States Patent
Fiedler

(10) Patent No.: US 10,383,409 B2
(45) Date of Patent: Aug. 20, 2019

(54) CLOSURE DEVICE

(71) Applicant: Fidlock GmbH, Hannover (DE)

(72) Inventor: Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 377 days.

(21) Appl. No.: 14/903,855

(22) PCT Filed: Jul. 11, 2014

(86) PCT No.: PCT/EP2014/064969
§ 371 (c)(1),
(2) Date: Jan. 8, 2016

(87) PCT Pub. No.: WO2015/004278
PCT Pub. Date: Jan. 15, 2015

(65) Prior Publication Data
US 2016/0183642 A1    Jun. 30, 2016

(30) Foreign Application Priority Data

Jul. 11, 2013 (DE) .......................... 10 2013 213 633

(51) Int. Cl.
*A44B 99/00* (2010.01)
*A45C 13/10* (2006.01)
(Continued)

(52) U.S. Cl.
CPC .......... *A44B 99/005* (2013.01); *A01K 27/005* (2013.01); *A44B 11/25* (2013.01); *A45C 13/1069* (2013.01); *B25G 3/36* (2013.01); *F16B 1/00* (2013.01); *F16B 21/04* (2013.01); *F16G 11/10* (2013.01); *F16L 33/223* (2013.01);

(Continued)

(58) Field of Classification Search
CPC ... A44B 99/005; A44B 11/25; A45C 13/1069; B25G 3/36; F16B 21/04; A44C 5/2057; A44D 2200/10
See application file for complete search history.

(56) References Cited

U.S. PATENT DOCUMENTS 3,594,876 A    7/1971  Gunther
4,359,256 A    11/1982 Gallusser et al.
(Continued)

FOREIGN PATENT DOCUMENTS

DE          2049870         4/1971
DE    102008006135 A1        7/2009
(Continued)

*Primary Examiner* — Jason W San
(74) *Attorney, Agent, or Firm* — The Webb Law Firm

(57) ABSTRACT

A closure device with a first and a second closure part, which each include at least one connecting region, is provided. For closing the closure device, the first closure part is attachable to the second closure part along a connection axis and by rotation about the connection axis relative to the second closure part is movable into the closed position, wherein in the closed position the two closure parts are held at each other via their connecting regions. The connecting regions each include at least one sliding surface and at least one blocking surface such that the closure parts are rotatable along their sliding surfaces relative to each other about the connection axis into the closed position, when the two closure parts are pressed towards each other by external forces along the connection axis.

20 Claims, 23 Drawing Sheets

(51) Int. Cl.
*F16B 21/04* (2006.01)
*F16G 11/10* (2006.01)
*A01K 27/00* (2006.01)
*A44B 11/25* (2006.01)
*B25G 3/36* (2006.01)
*F16B 1/00* (2006.01)
*F16L 33/22* (2006.01)
*G02B 7/02* (2006.01)
*A45C 13/26* (2006.01)

(52) U.S. Cl.
CPC ........... *G02B 7/02* (2013.01); *A45C 13/26* (2013.01); *F16B 2001/0035* (2013.01)

(56) References Cited

U.S. PATENT DOCUMENTS

| | | | |
|---|---|---|---|
| 4,486,918 A * | 12/1984 | Peebles | G05G 1/10 16/422 |
| 4,990,022 A * | 2/1991 | Watanabe | B25J 15/04 285/362 |
| 4,993,575 A | 2/1991 | Maes | |
| 5,826,309 A * | 10/1998 | Tsamas | A44C 5/2052 24/68 J |
| 6,857,169 B2 * | 2/2005 | Chung | A44B 11/258 24/303 |
| 7,496,994 B1 * | 3/2009 | Headley | A44C 5/2019 24/303 |
| 7,603,059 B2 * | 10/2009 | Marumoto | G03G 15/757 192/56.61 |
| 8,061,923 B2 * | 11/2011 | Simmons | F16D 1/108 355/67 |
| 9,345,433 B1 * | 5/2016 | Shinozuka | A61B 5/1115 |
| 9,936,772 B2 * | 4/2018 | Paik | A44B 11/2592 |
| 9,943,142 B1 * | 4/2018 | Thomsen | A44B 99/005 |
| 9,961,966 B2 * | 5/2018 | Ryan | A44B 1/14 |
| 2007/0034595 A1 | 2/2007 | Foster et al. | |
| 2008/0047111 A1 | 2/2008 | Garber | |
| 2009/0238659 A1 | 9/2009 | Zoeller et al. | |
| 2010/0263173 A1 | 10/2010 | Clarke et al. | |
| 2010/0283269 A1 | 11/2010 | Fiedler | |
| 2010/0308605 A1 | 12/2010 | Fiedler | |
| 2011/0030174 A1 | 2/2011 | Fiedler | |
| 2011/0079573 A1 * | 4/2011 | Nakamura | B65D 43/0231 215/331 |
| 2011/0298227 A1 * | 12/2011 | Fiedler | A45C 13/1069 292/251.5 |
| 2013/0011179 A1 * | 1/2013 | Fiedler | A45C 13/10 403/49 |
| 2014/0093327 A1 * | 4/2014 | Bowers | F16B 39/24 411/111 |
| 2014/0105679 A1 * | 4/2014 | Oliver | F16B 21/04 403/348 |
| 2014/0154004 A1 * | 6/2014 | Agate | F16B 21/04 403/349 |
| 2015/0121667 A1 * | 5/2015 | Humpert | A44B 17/0041 24/687 |
| 2015/0211559 A1 * | 7/2015 | de Ruffray | F16B 21/04 403/350 |
| 2016/0007696 A1 * | 1/2016 | Neblett | A43B 3/122 24/702 |
| 2016/0316862 A1 * | 11/2016 | Ho | F16B 21/04 |
| 2016/0338455 A1 * | 11/2016 | Chuan | A44B 19/305 |
| 2017/0057420 A1 * | 3/2017 | Fiedler | B60R 11/00 |
| 2017/0119108 A1 * | 5/2017 | Schlick | A44B 99/005 |
| 2017/0276161 A1 * | 9/2017 | Oliver | F16B 21/04 |
| 2017/0276290 A1 * | 9/2017 | Fiedler | A45C 13/10 |
| 2018/0132576 A1 * | 5/2018 | Hashimoto | A44C 5/2057 |
| 2018/0177660 A1 * | 6/2018 | Davies | A61G 15/10 |
| 2018/0192745 A1 * | 7/2018 | McDaniel | A44B 11/2588 |

FOREIGN PATENT DOCUMENTS

| | | |
|---|---|---|
| DE | 102008019063 B4 | 4/2011 |
| EP | 0052538 A2 | 5/1982 |
| EP | 0403322 A1 | 12/1990 |
| GB | 2449906 A | 12/2008 |
| JP | 459077 U | 5/1992 |
| JP | 200558358 A | 3/2005 |
| JP | 201363258 A | 4/2013 |
| WO | 2008006357 A2 | 1/2008 |
| WO | 2008034521 A1 | 3/2008 |

* cited by examiner

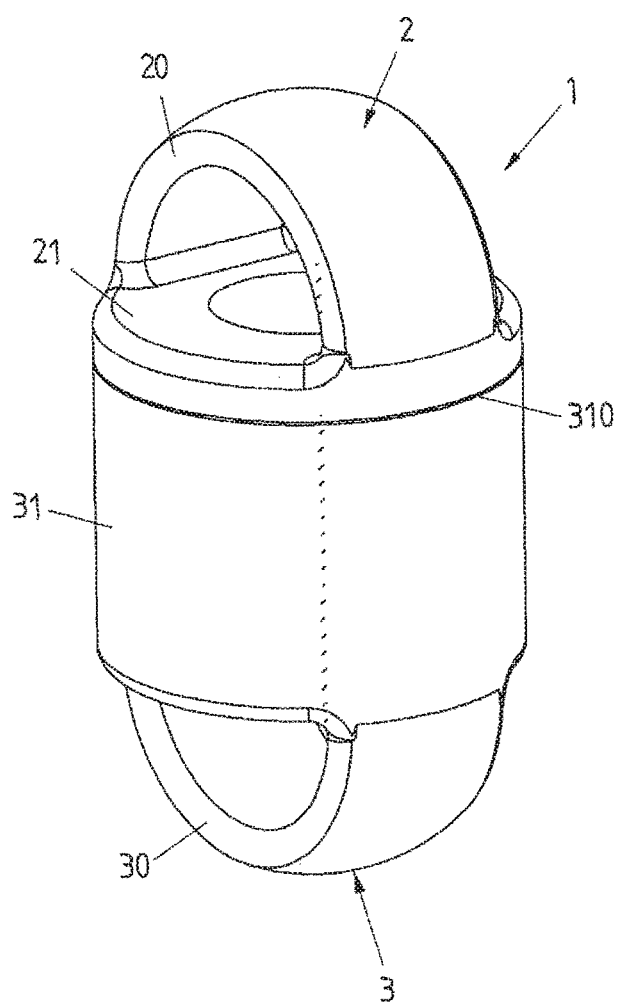

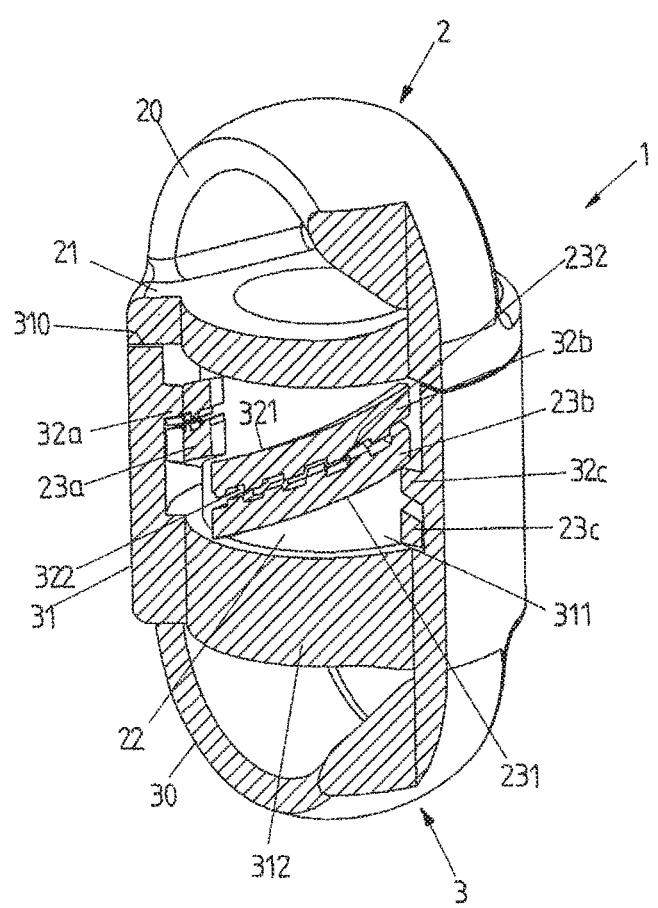

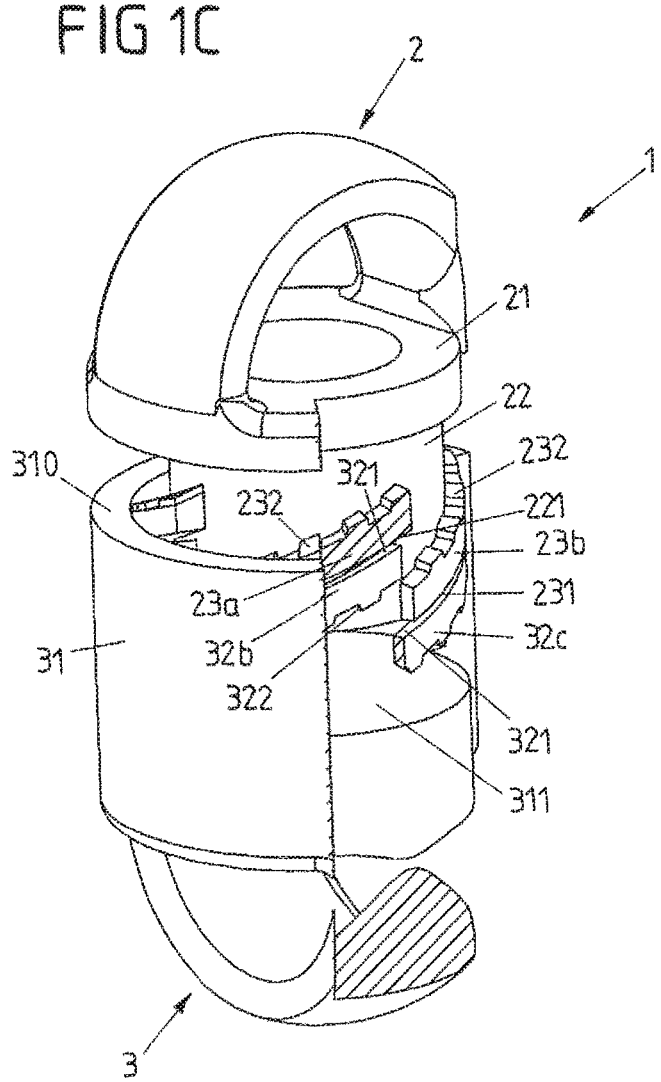

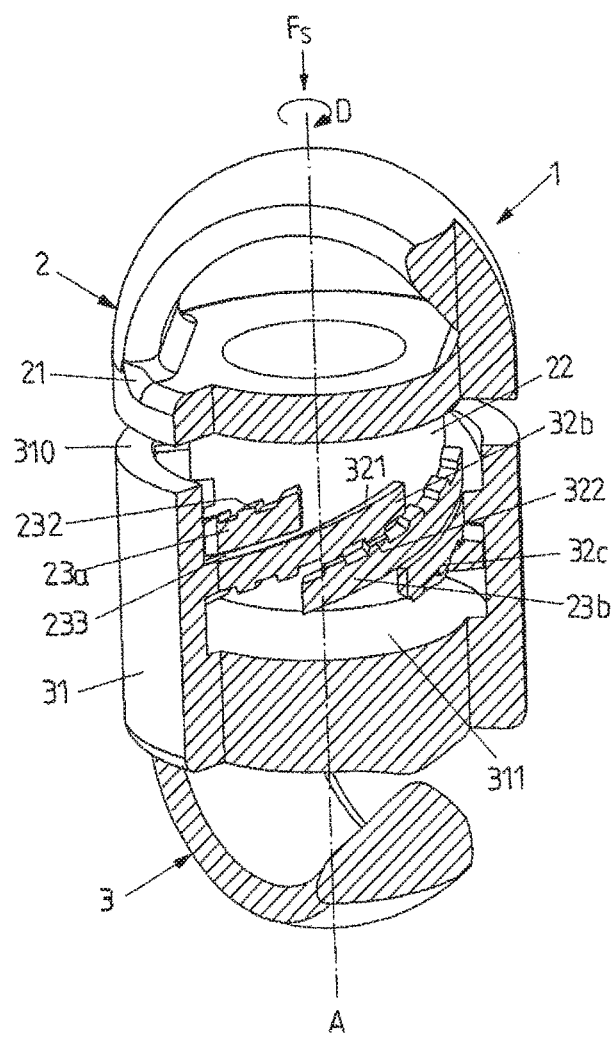

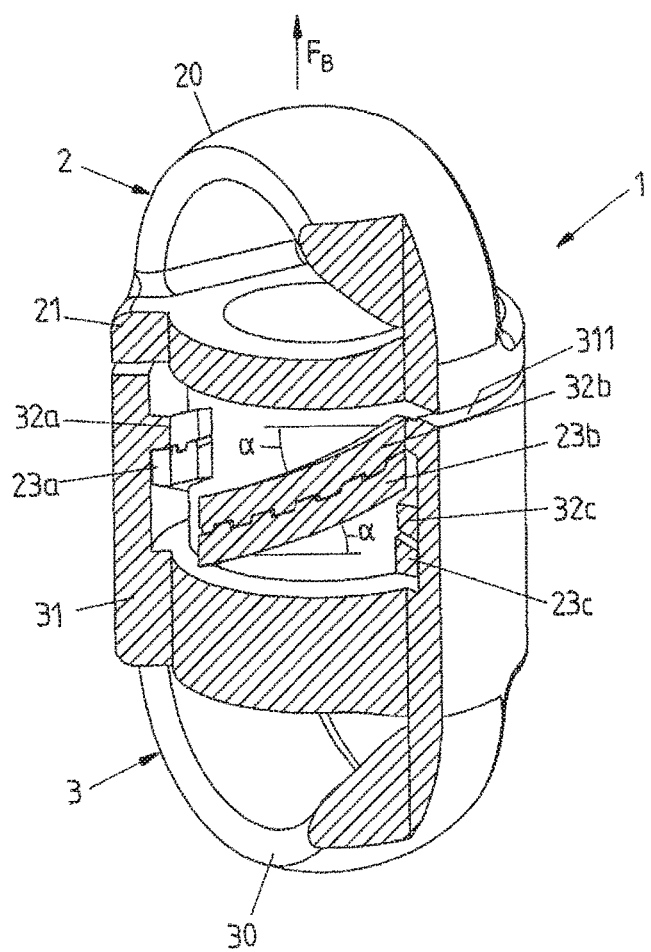

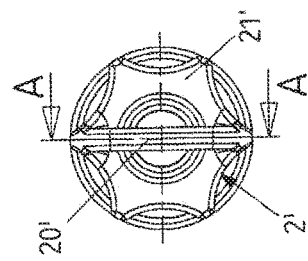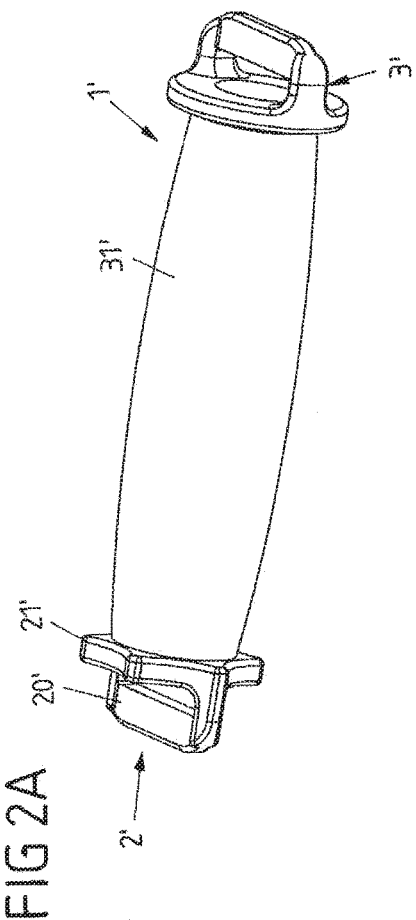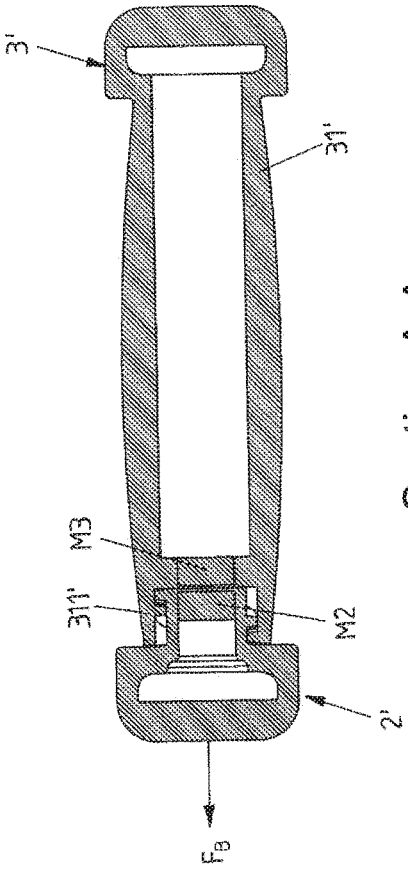

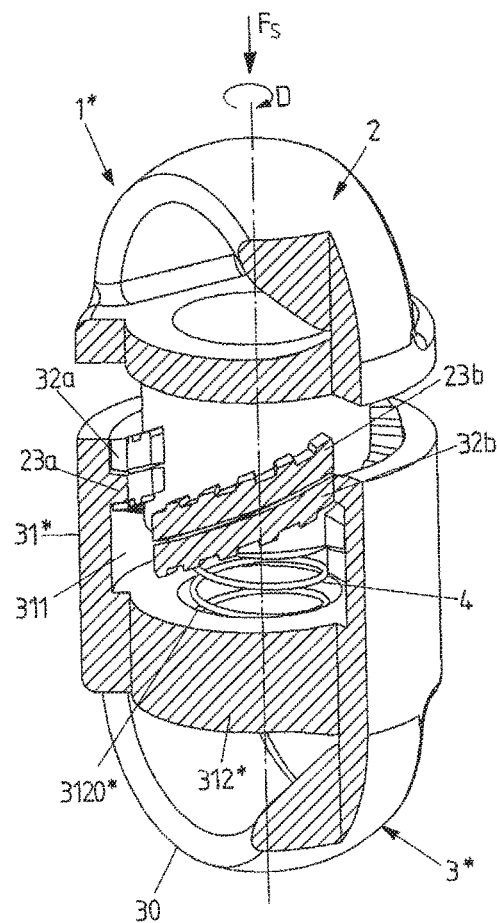
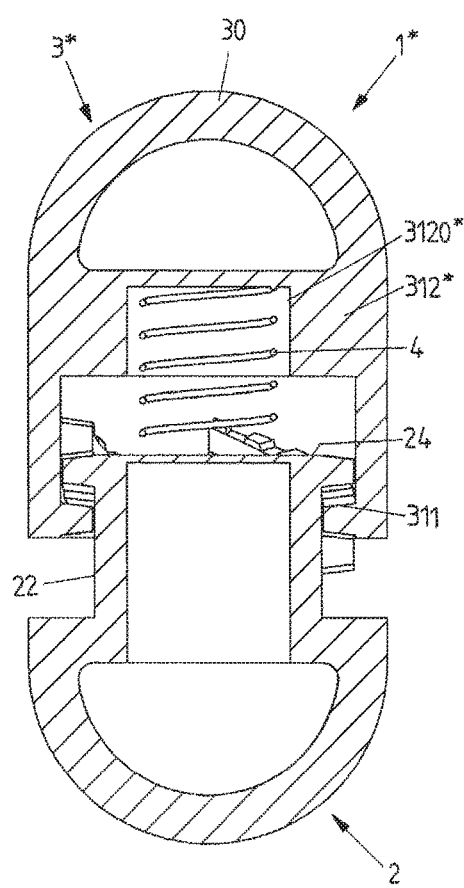
Section A-A

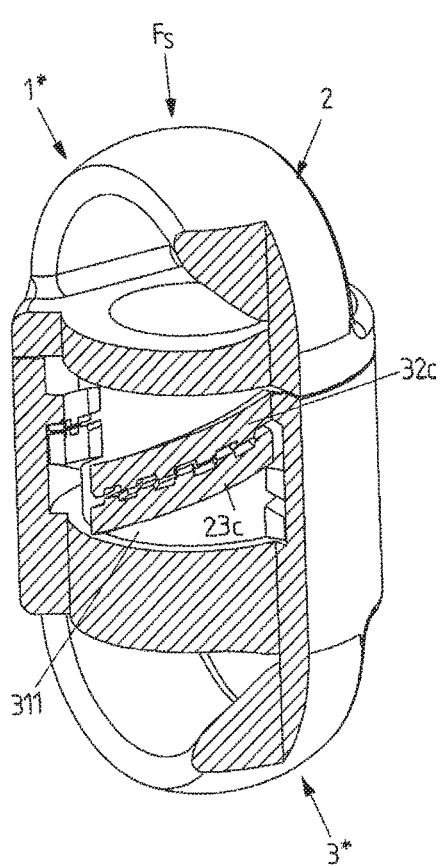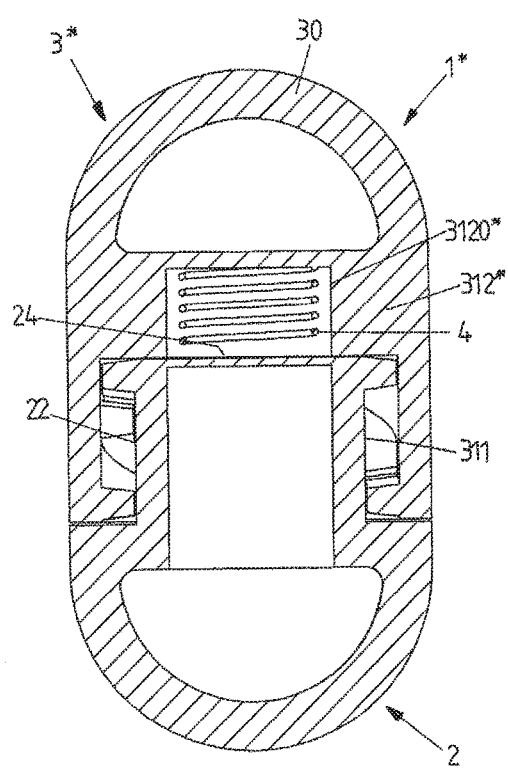
Section A-A

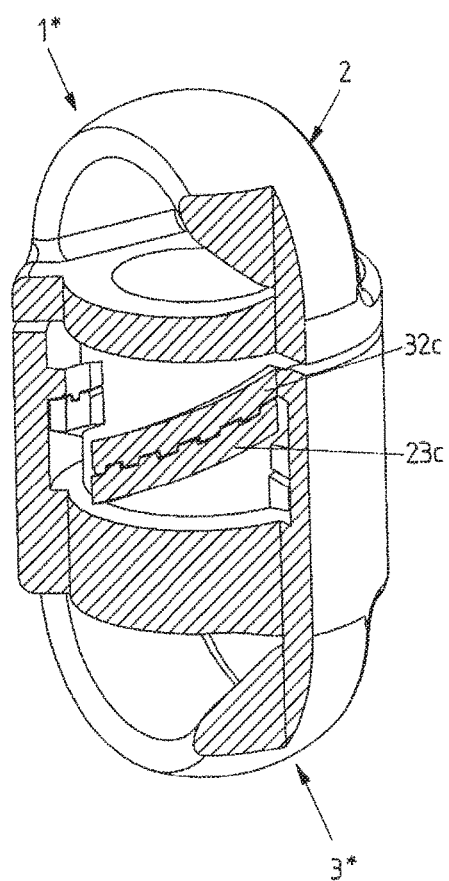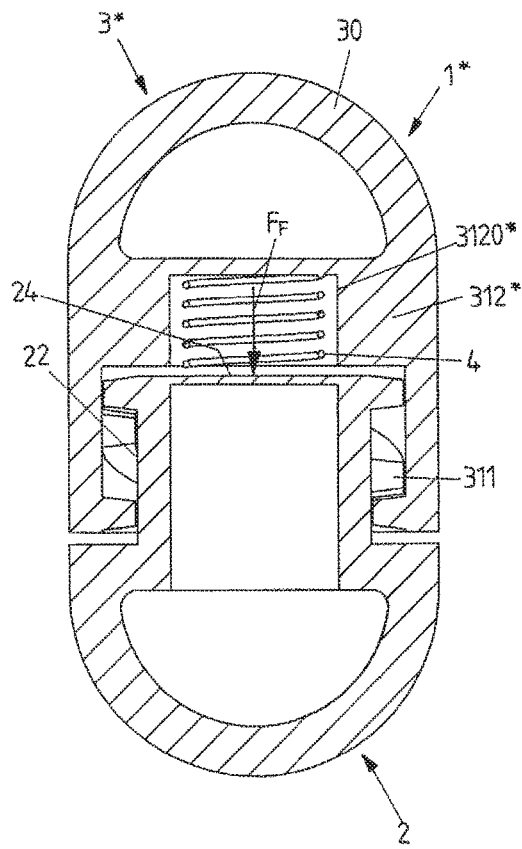
Section A-A

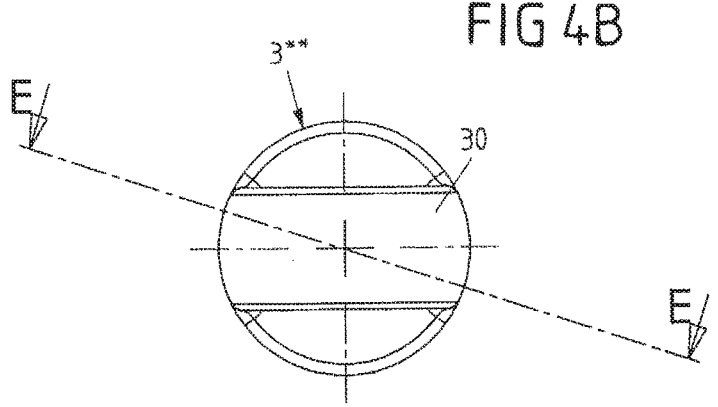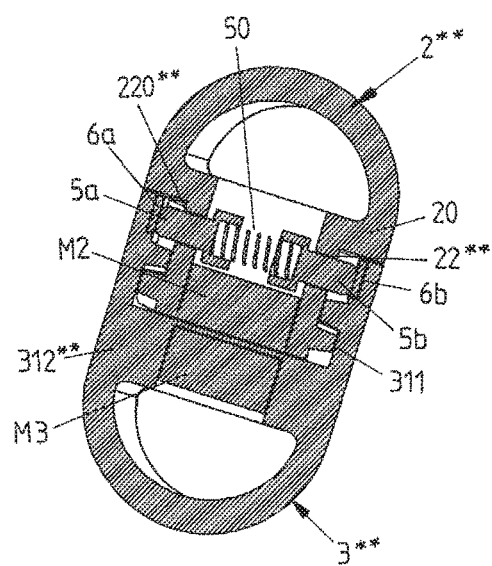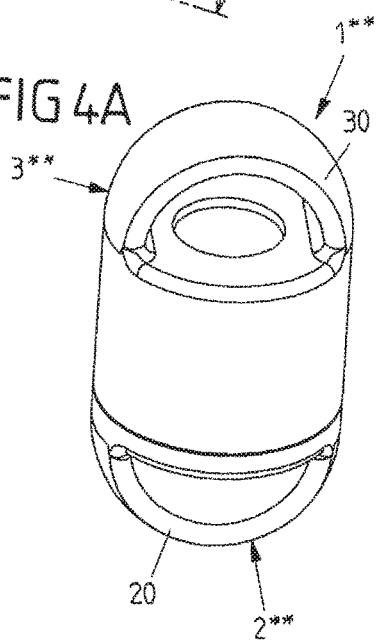
Section E-E

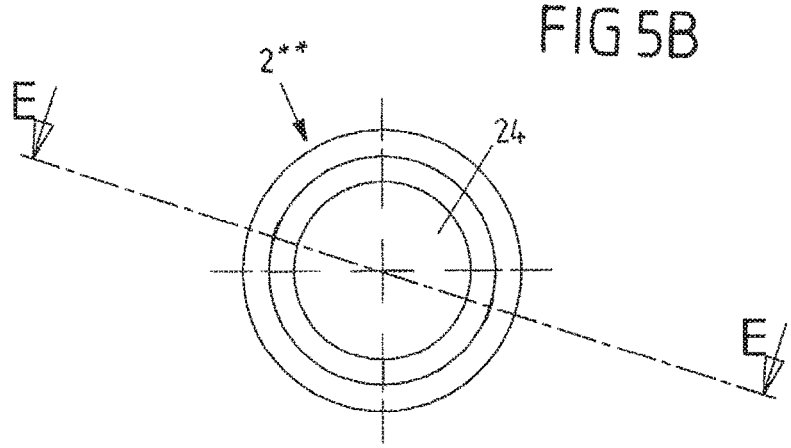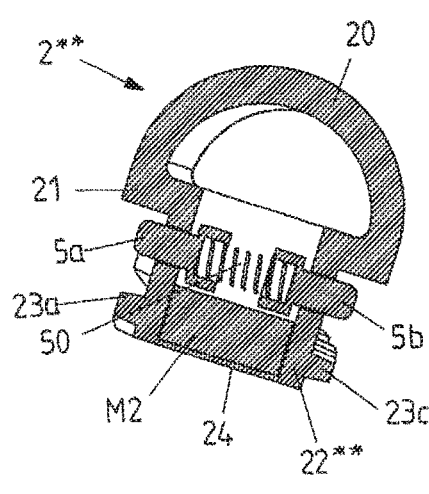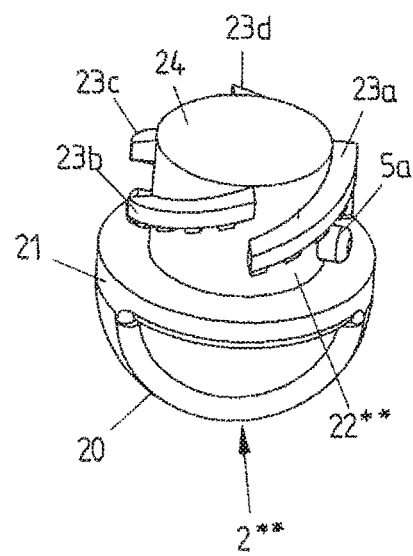
Section E-E

Section E-E

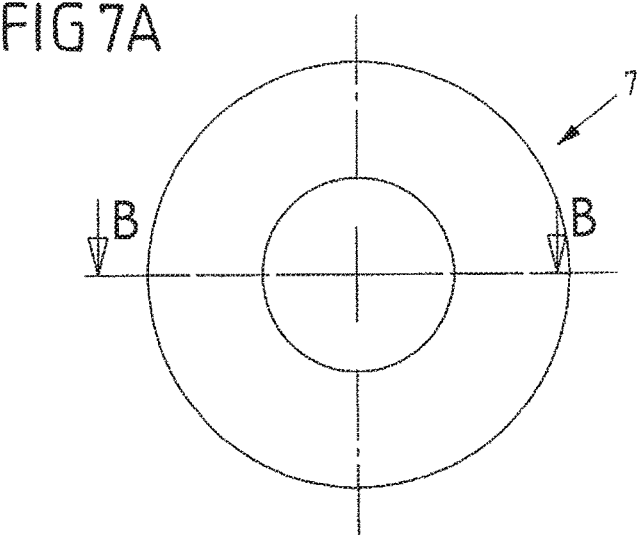
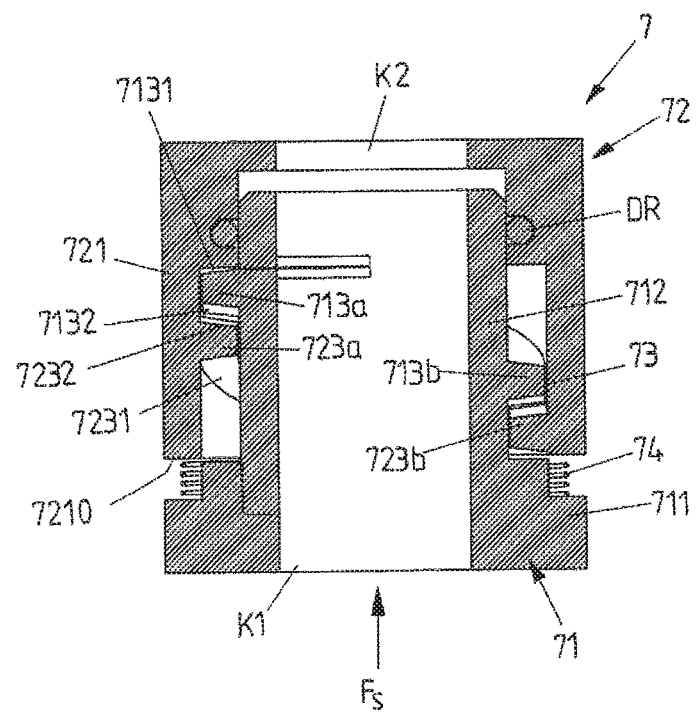

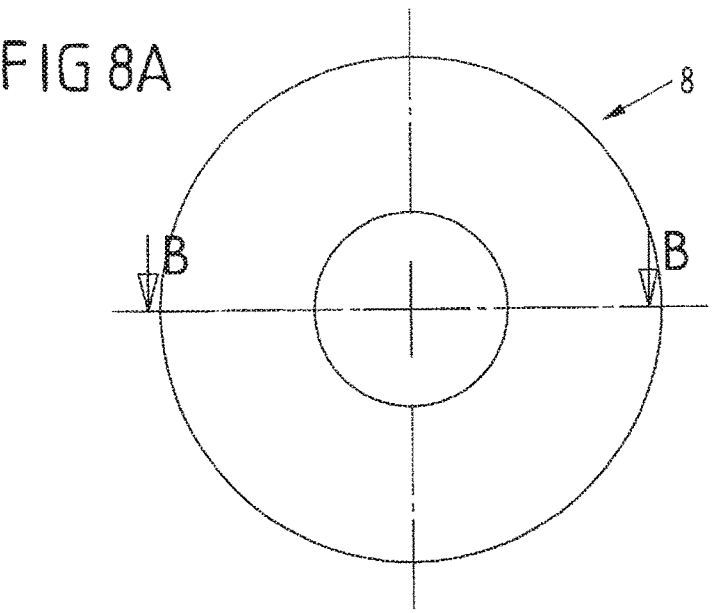
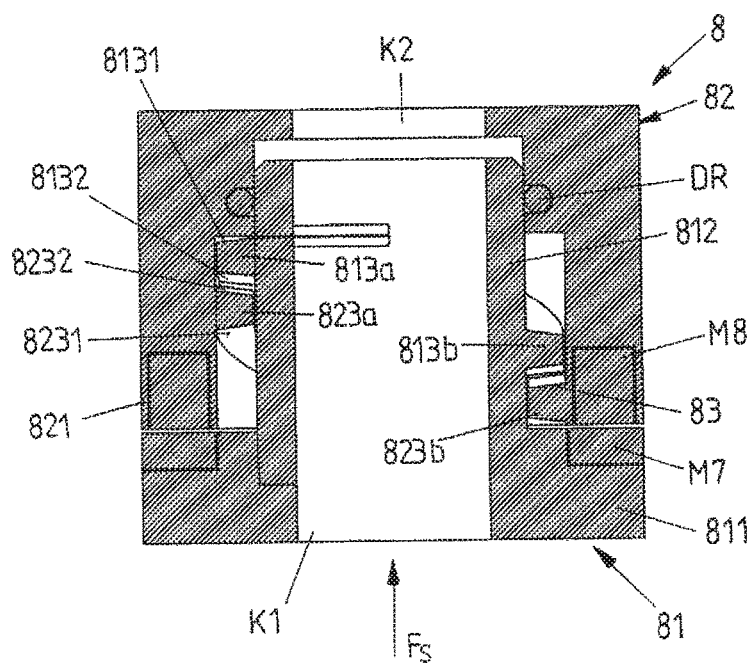

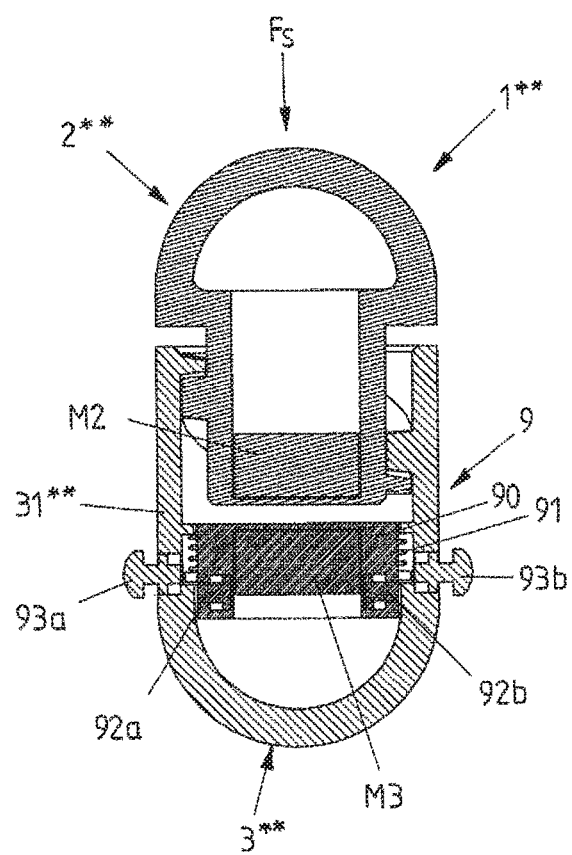

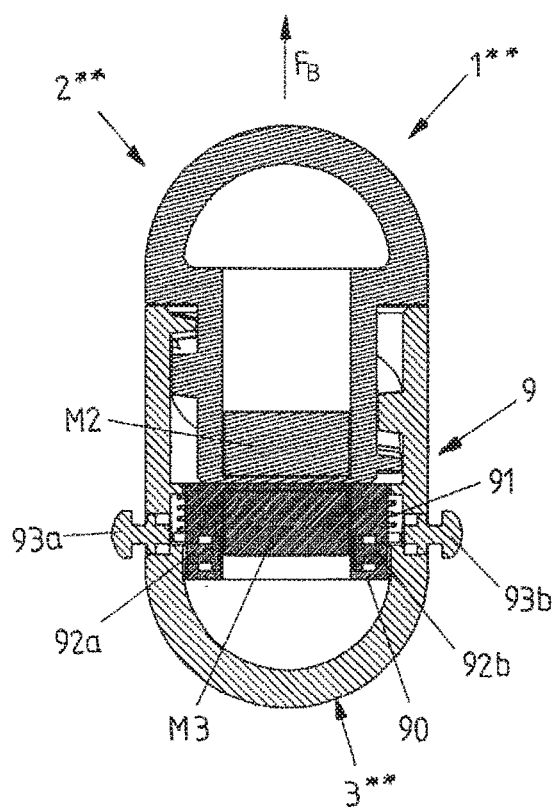

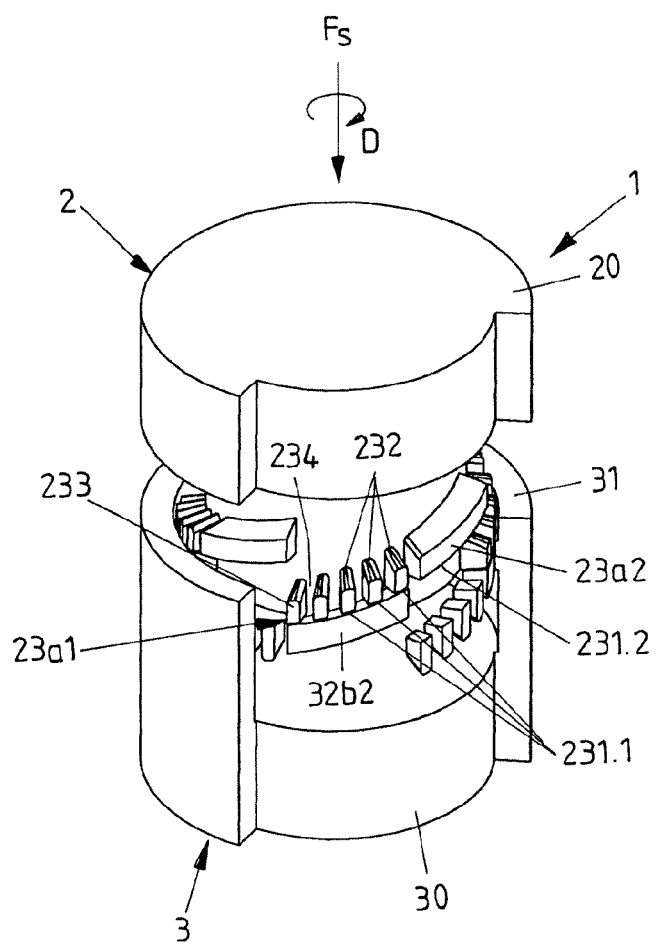

CLOSURE DEVICE

CROSS-REFERENCE TO RELATED APPLICATIONS

This application is the United States national phase of International Application No. PCT/EP2014/064969 filed Jul. 11, 2014, and claims priority to German Patent Application No. 10 2013 213 633.1 filed Jul. 1, 2013, the disclosures of which are hereby incorporated in their entirety by reference.

BACKGROUND OF THE INVENTION

Field of the Invention

This invention relates to a closure device.

Description of Related Art

A generic closure device includes a first closure part with at least one first connecting region and a second closure part with at least one second connecting region, which are to be connected with each other in the manner of a screw connection and can be transferred into a closed position in which the two closure parts are held at each other via their connecting regions. Correspondingly, for closing the closure device the first closure part is attachable to the second closure part along a connection axis and by rotation about the connection axis relative to the second closure part is movable into the closed position.

A closure device with two closure parts, which can be connected with each other in the manner of a screw connection, is known in principle in different forms. However, turning in of a closure part for closing the closure device in conventional screw connections regularly involves an increased expenditure of force, in order to securely arrest the two closure parts at each other. For release, a comparatively high force then must be applied as well. In addition, usual screw connections frequently are suitable for fast and uncomplicated opening only to a limited extent.

For this reason, closure devices with bayonet lock are used in the alternative, in which a closure part likewise is rotated about a connection axis relative to another closure part, in order to securely arrest the two closure parts at each other and close the closure device. In bayonet locks, however, it regularly is disadvantageous that the two closure parts must be aligned relative to each other very accurately, in order to put the parts of the bayonet lock into each other.

Furthermore, in closure devices in which for closing the closure device the two closure parts are connected with each other in the manner of a screw connection it regularly is disadvantageous that the connection cannot easily be secured against opening of the closure device. To prevent that one of the closure parts inadvertently is rotated relative to the other closure part in an opening direction and the connection herewith is released, additional components such as pins, cotter keys or latches regularly are used. However, especially in manually operable closure devices handling and comfort thereby are deteriorated.

From DE 10 2008 019 063 B4 there is furthermore known a closure device in which a first closure part latches with a second closure part and is held in a closed position via spring locking elements of the second closure part. The spring locking elements are movable radially with respect to the connection axis, along which the first closure part is guided to the second closure part.

In a closure device known from DE 10 2008 019 063 B4, the first closure part on attachment to the second closure part is automatically rotated relative to the second closure part by magnetic elements provided at the first and the second closure part into a position in which the magnets attract each other. Via the magnets, the first closure part then without rotation is pulled into the closed position along the connection axis, until the spring locking elements snap into place. Opening of the closure device then is possible, however, by rotating the first closure part. DE 10 2008 019 063 B4 describes that a closure device disclosed therein can have the tendency to unscrew under load. Inadvertent opening of the closure device can be counteracted, however, by suitable dimensions and strength of the magnets used.

Thus, DE 10 2008 019 063 B4 provides that opening of the closure device can be achieved by rotating the first closure part. In a closure device of DE 10 2008 019 063 B4, in contrast to a generic closure device, it is however not provided that the first closure part is movable relative to the second closure part into a closed position by rotation about the connection axis in the manner of a screw connection. Rather, the first closure part is pulled into the closed position along the connection axis and is latched at the second closure part by spring locking elements radially movable with respect to the connection axis. Moreover, DE 10 2008 019 063 B4 proposes to use larger or stronger magnets, in order to counteract an inadvertent opening of the closure device under load. In closures subjected to a higher load, however, such measure has its limits, as it is not possible to use magnets of any size, without this leading to a disproportionate increase of the dimensions of the closure device and its manufacturing costs.

SUMMARY OF THE INVENTION

An object underlying the present invention hence is to provide an improved closure device which allows easy closing of the closure device by rotating one closure part relative to another closure part and in which in a closed position undesired opening of the closure device at the same time is prevented in a simple way.

According to the invention, the connecting regions of the two closure parts each have at least one sliding surface and at least one blocking surface such that the closure parts are rotatable relative to each other along their sliding surfaces about the connection axis into the closed position of the closure device, when a (resultant) force acts on the two closure parts along the connection axis in a first loading direction, and a rotation of the two closure parts relative to each other about the connection axis is blocked by the blocking surfaces resting against each other, when a (resultant) force acts on the two closure parts along the connection axis in a second loading direction opposite to the first loading direction.

To ensure that either the sliding surfaces or the blocking surfaces of the two closure parts rest against each other, it furthermore is provided that in the closed position the closure parts are axially movable relative to each other by a clearance with respect to the connection axis. In this way, blocking via the blocking surfaces resting against each other can be released, and the sliding surfaces can be brought in contact with each other by moving the two closure parts axially relative to each other.

Via a resultant force in the first loading direction, the two closure parts can be pressed towards each other or be pulled away from each other along the connection axis. In this first loading condition, a rotation of the two closure parts relative to each other is permitted. In another loading condition, when a resultant force acts in the opposite loading direction, the two closure parts are blocked against a rotation via their blocking surfaces.

With the solution according to the invention it is achieved that on the one hand closing of the closure device is possible relatively easily by rotating the two closure parts relative to each other along the sliding surfaces. At the same time it is ensured by additionally provided blocking surfaces that in a closed position the two closure parts no longer can be rotated relative to each other, when the two closure parts are loaded in the closed position. Via the blocking surfaces, the closed position thus is secured, and opening of the closure device is prevented when the closure device is loaded in a loading direction which is opposite to the loading direction in which the closure parts are loaded on turning in. For example, it can be provided that via the blocking surfaces a rotation of the closure parts relative to each other is blocked, when the same are subjected to a tensile load. Tensile load here in particular refers to the fact that forces act on the closure parts, by which the two closure parts are pulled away from each other and as a result of which the two closure parts without arrestment via their connecting regions would be removed from each other along the connection axis.

Due to the incorporated clearance between the two closure parts in the closed position, an alternation between two relative positions of the two closure parts is possible. For example, by pressing the two closure parts towards each other and by correspondingly overcoming the clearance, the contact between the blocking surfaces can be released, so that the same no longer block a rotation of the two closure parts relative to each other.

In one design variant it is provided that a sliding surface and/or a blocking surface is formed at a threaded portion of the respective connecting region. The respective connecting region thus includes a portion on which a sliding surface and/or a blocking surface is formed and which extends along a part of a virtual helix about an extension axis of the connecting region. A sliding surface in principle can be formed on one threaded portion and a blocking surface can be formed on another threaded portion of the respective closure part, so that on a threaded portion only one sliding surface or one blocking surface each is provided.

Preferably, both a sliding surface and a blocking surface is formed on a threaded portion, namely on opposite sides of the threaded portion. Correspondingly, a first side of the threaded portion is provided for the facilitated closing and opening of the closure device via the sliding surfaces, while the other, second side of the same threaded portion is provided for blocking a rotation of the two closure parts in the closed position, and hence for the arrestment of the closed position.

In principle, several (at least two) threaded portions succeeding each other in a circumferential direction about the respective extension axis (and hence in the connected condition of the two closure parts in a circumferential direction about the connection axis) can be provided, in order to connect the two closure parts with each other in the manner of a screw connection. Via the axial distance of the threaded portions to each other the clearance is defined, by which the two closure parts are axially movable relative to each other in the closed position, in order to on the one hand bring the sliding surfaces or on the other hand the blocking surfaces in contact with each other.

In one design variant it is provided that a threaded portion is formed with a sliding surface such that via sliding surfaces of the closure parts resting against each other the closure parts are rotated relative to each other into the closed position, when the two closure parts are pressed towards each other by external forces along the connection axis. This means that no torque must act on the two closure parts, in order to transfer the same into the closed position. In this design variant the sliding surfaces rather are formed such that a rotation relative to each other in direction of the closed position is forced upon the closure parts via the sliding surfaces, when the closure parts are pressed towards each other, e.g. manually by a user, after the two closure parts have been attached to each other. In the case of a movement of the two closure parts relative to each other, it is of course also possible that one of the closure parts is retained and the other one of the two closure parts is rotated about the connection axis.

To achieve an independent rotation of the closure parts relative to each other into the closed position via the sliding surfaces, when the closure parts are pressed towards each other without having to apply a torque from outside, the pitch of a threaded portion with a sliding surface for example can be chosen greater than 10°, preferably in the range from 10° to 50° and in particular in the range from 15° to 45°.

Alternatively or in addition, the sliding surface can have a smooth surface, in order to improve sliding of the sliding surfaces on each other and in particular to facilitate turning in into the closed position. A smooth surface for example is understood to be a surface which has a mean roughness of below 1.2 µm.

For blocking against a rotation in the closed position, the blocking surfaces can rest against each other frictionally and/or positively. For example, blocking surfaces therefor can be provided with a roughened surface or a friction lining, in order to ensure a frictional connection between the blocking surfaces, when the closure parts are subjected to a tensile load. Alternatively or in addition, a positive connection can be realized by the blocking surfaces, for example by a toothing. The blocking surfaces thus can be engageable with each other via a toothing, in order to block a rotation of the two closure parts in particular positively relative to each other. For such toothing for example both closure parts can form latching webs and latching openings for the blocking surfaces, which alternately are in engagement with each other, when the closure parts are present in the closed position and the closure device is loaded with a force (opposite to the loading direction for turning in the first closure part) which has the tendency to separate the two closure parts from each other.

In one exemplary embodiment, the closure device includes
- on a first threaded portion of at least one closure part at least one sliding surface and at least one blocking surface on opposite sides of the respective threaded portion, and
- on a second threaded portion of this closure part, which follows the first threaded portion in circumferential direction, merely one sliding surface.

Thus, in such design variant two different types of threaded portions are formed on one closure part, on the one hand a first type of threaded portion with at least one blocking surface or several blocking surfaces and at least one opposite sliding surface, and on the other hand a second type of threaded portion which exclusively forms a sliding surface. The two first and second threaded portions can be arranged directly adjacent to each other along a helix about the connection axis, so that the second threaded portion directly—preferably along the direction of rotation in which the second closure part is to be rotated for opening the closure device—adjoins the first threaded portion.

Preferably, several pairs of first and second threaded portions spatially separated from each other (along a circumferential direction) each are provided at the closure parts.

For example, latching webs can be part of the first threaded portion and on a first side form parts of the blocking surfaces and on an opposite second side each form a sliding surface. For blocking in the closed position, a latching opening then is formed at each first threaded portion of the two closure parts between a pair of latching webs each, into which a latching web of the respective other closure part can engage in a positive manner.

In such design variant it can be provided in principle that the different types of threaded portions alternately can slide along each other on closing of the closure device via their sliding surfaces. For example, when moving into the closed position, a first threaded portion of the first closure part, which is formed with latching webs, alternately would slide a) along sliding surfaces of a first threaded portion of the second closure part, which are formed on an (upper or lower) side of its latching webs, and b) along a sliding surface of an adjoining second threaded portion of the second closure part, which—in contrast to the first threaded portion does not define blocking surfaces on its opposite (lower or upper) side.

In an alternative variant, however, the first closure part with its first threaded portions including the latching webs and the second closure part with its first threaded portions including the latching webs also can be formed and adjusted to each other such that on rotation into the closed position the sliding surfaces which are formed on the latching webs of the first closure part do not get in contact with the sliding surfaces which are formed on the latching webs of the second closure part. In this variant, the latching webs of the first threaded portions thus merely get in mutual contact for blocking in the closed position. For example, this is achieved in that the first and second threaded portions are formed on the closure parts such that the closure parts already get into the closed position by rotation about a comparatively small angle of rotation, in which closed position merely the second threaded portions can slide along each other.

In one design variant at least one pretensioning element is provided, via which the two closure parts in the closed position are pretensioned into a blocking position in which the blocking surfaces blockingly rest against each other. Such pretensioning element thus generates a pretensioning force which counteracts pressing of the two closure parts towards each other and hence presses or pulls the blocking surfaces against each other. For example, when the one (first) closure part is turned into the other (second) closure part in a closing direction along the connection axis and the one closure part thereby is pressed in closing direction, so that the sliding surfaces of the two closure parts rest against each other, the pretensioning force of the at least one pretensioning element acts opposite to the closing direction, so that the blocking surfaces automatically blockingly rest against each other, as soon as the one (first) closure part no longer is manually pressed in the closing direction.

The pretensioning element for example can comprise a spring element, such as a coil spring. Alternatively or in addition, the use of a foam or air pressure spring is conceivable. Furthermore, the pretensioning element can comprise a magnet, in order to produce a pretensioning force via a magnetic force.

In one design variant it is provided that at least one auxiliary closing means exerts a force which supports the movement of the two closure parts in direction of the closed position. For example, this can be at least one magnet which exerts a magnetic force that supports pressing of the two closure parts towards each other. The two closure parts here are attracted towards each other by a magnetic force, in order to facilitate turning in of the one closure part into the other closure part. For this purpose, it can be provided for example that in the first closure part a first magnet is provided and in the second closure part a second magnet is provided and the two magnets attract each other.

In principle, magnets within the closure parts can be embedded or inserted in a (plastic) material of the respective closure part and be fixed thereto. The magnets for example can be disk-shaped or cuboid. In the case of a not point-symmetrical geometry of the respective magnet, a magnetic reversing impulse can be effected depending on the position of the two closure parts relative to each other.

In one design variant, the closure device includes a first closure part with at least one first contact element and a second closure part with at least one second contact element, wherein in the closed position the two contact elements are in contact with each other in an electrically conducting manner. Accordingly, by means of such variant of a closure device according to the invention a signal can be generated when the two closure parts properly are present in their closed position, and/or a signal can be transmitted via the contact elements of the closure device. It also is possible to conduct electric current via the contact elements and thus utilize the same for the transmission of an electric power.

In a development based thereon, a contact element on a closure part for example is formed by an elastically mounted contact pin and on the other closure part by a contact plate. The elastically mounted contact pin, which preferably has a (circular) cylindrical contacting portion, is radially movable on its closure part with respect to the connection axis, so that in the closed position the respective contact pin is pretensioned in direction of the associated contact element on the other closure part, but the contact pin does not block turning in of the respective closure part into the other closure part. In the properly closed position, the contact pin then is pressed in radial direction against the contact plate which is arranged on the other closure part.

Electrically conductive contact elements, however, can also be formed for example by spring elements arranged on end faces of the closure parts.

A closure device according to the invention can be used in different ways and in particular in different items of daily use. For example, the closure device can be part of a dog leash, a hose coupling, a camera lens or a carrying handle.

Moreover, it should also be noted that a thread, via which the two closure parts can be screwed into each other, can of course also be a multi-start, in particular two-start or four-start thread. A distance of the individual threads defines the specified clearance, in order to be able to axially move the closure parts relative to each other in their closed position and bring either the sliding surfaces or the blocking surfaces in engagement with each other. Preferably, the distance of the threads is chosen such that there is a clearance as small as possible.

In principle, it is regarded as advantageous when the size of the clearance is below 0.5 mm, in particular in a range from 0.05 to 0.4 mm.

BRIEF DESCRIPTION OF THE DRAWINGS

Further advantages and features of the present invention will become apparent from the following description of exemplary embodiments with reference to the Figures.

In the drawings:

FIGS. 1A-1E show a first exemplary embodiment of a closure device according to the invention in different views;

FIGS. 2A-2C show a second exemplary embodiment of a closure device according to the invention in different views with closure parts modified in particular geometrically with respect to the first design variant;

FIGS. 3A-3F show different views of a development of the first design variant with a pretensioning element, in order to pretension the two closure parts into a blocking position;

FIGS. 4A-4C show a further alternative development of the first design variant in different views;

FIGS. 5A-5C show a first closure part of the closure device of FIGS. 4A-4C in different views;

FIGS. 7A-7B show a third design variant of a closure device according to the invention, which for example is usable as hose coupling;

FIGS. 8A-8B show a development of the design variant of FIGS. 7A-7B;

FIGS. 9A-9D show a development of the design variant of FIGS. 4A-6C with a blocking means in different views;

FIGS. 10A-10E show views of a further design variant of a closure device according to the invention, in which the two closure parts each form blocking and sliding surfaces on latching webs spaced from each other of a first segmented threaded portion and merely one sliding surface each on a second longitudinally extending threaded portion following in circumferential direction.

DETAILED DESCRIPTION OF THE INVENTION

Figure 6B:
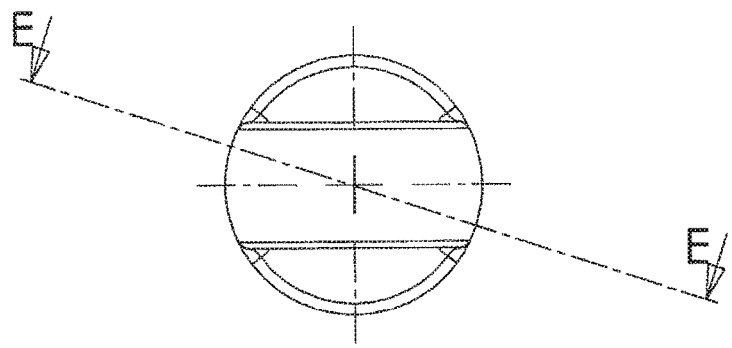
FIGS. 6A-6C show a second closure part of the design variant of FIGS. 4A-4C in different views.

FIGS. 1A-1E show a first design variant of a closure device 1 according to the invention in different views and positions of two closure parts 2 and 3 relative to each other, in which a first closure part 2 and a second closure part 3 can be connected with each other in the manner of a screw connection and can be held in a closed position. A closed position is shown for example in FIGS. 1A and 1B. The first closure part 2 here is formed bolt-like and includes a disk-shaped head part 21 from whose bottom side a connecting region in the form of a circular cylindrical sleeve portion 22 extends and on whose upper side an arched, bridge-like handle portion 20 is formed. The second closure part 3 in turn includes a partly hollow, likewise circular cylindrical sleeve body 31 as connecting region, which likewise forms an arched handle portion 30 appearing bridge-like. The handle portion 30 is located opposite the handle portion 20 of the first closure part 2 along a direction of longitudinal extension of the closure device 1 and along a connection axis A, along which the two closure parts 2 and 3 are turned into each other.

The handle portions 20 and 30 can be grasped by a user, in order to manually close and open the closure device 1. Alternatively or in addition, additional components can be attached thereto, which are to be coupled with each other via the closure device 1.

To connect the two closure parts 2 and 3 with each other, the sleeve portion 22 of the first closure part 2 can be turned into a cavity 311 of the sleeve body 31 of the second closure part 3 along the connection axis A and by rotating the first closure part 2. The first closure part 2 with its sleeve portion 22 can be turned into the sleeve body 31 of the second closure part 3, until a support edge of the head part 21 rests against a circularly ring-shaped end face 310 of the second closure part 3 or—preferably an end face of the sleeve portion 22 away from the head part 21 comes to rest against a base part 312 at the foot of the cavity 311.

Selectively turning in the sleeve portion 22 into the sleeve body 31 in a direction of rotation D (cf. FIG. 1D) here becomes possible via two threads which are formed at the sleeve portion 22 on the one hand and at the sleeve body 31 on the other hand. An external thread of the sleeve portion 22 is formed by several (here four) threaded portions following each other in circumferential direction along the shell surface of the sleeve portion 22 and separated from each other, of which threaded portions 23a-23c are shown in the sectional representations of FIGS. 1B-1E. With this interrupted external thread a likewise interrupted internal thread of the sleeve body 31 corresponds. This internal thread is formed of several (here four) threaded portions following each other in circumferential direction along the inner wall of the sleeve body 31 and separated from each other, of which threaded portions 32a-32c are shown in the sectional representations of FIGS. 1B-1E.

Each of the threaded portions 23a-23c and 32a-32c extends along a section of a helix at the sleeve portion 22 or the sleeve body 31. The threaded portions 23a-23c of the internal thread of the first closure part 2 radially protrude from the sleeve portion 22 in direction of the inner wall of the sleeve body 31 with respect to the connection axis A. The threaded portions 32a-32c of the external thread of the second closure part 3 in turn radially protrude from the inner walls of the sleeve body 31 in direction of the shell surface of the sleeve portion 22. It thus is ensured that the two closure parts 2 and 3 at their connecting regions in the form of the sleeve portion 22 and the sleeve body 31 are in contact with each other almost exclusively via the threaded portions 23a-23c and 32a-32c and possible loads acting along the connection axis A thereby are transmitted.

Each of the threaded portions 23a-23c and 32a-32c has a blocking surface 232 or 322 and a sliding surface 231 or 321. A sliding surface 231, 321 and a blocking surface 232, 322 are present in axial direction of sides of the respective threaded portion 23a-23c or 32a-32c facing away from each other. For example, a threaded portion 23a, 23b or 23c of the first closure part 2 each forms a blocking surface 232 on an upper side facing the head part 21 and a sliding surface 231 on an opposite bottom side.

The sliding surfaces 231 and 321 and blocking surfaces 232 and 322 are formed on the two closure parts 2 and 3 such that when turning in the first closure part 2, the closure parts 2 and 3 are rotatable relative to each other about the connection axis A along their sliding surfaces 231 and 321, when the closure parts 2 and 3 are pressed towards each other along the connection axis A, i.e. for example the second closure part 3 is held and the first closure part 2 is pressed in direction of the second closure part 3 with a closing force $F_S$. The sliding surfaces 231 and 321 then rest against each other. A pitch a of the individual threaded portions 23a-23c and 32a-32c here is chosen so large and the sliding surfaces are provided with such a smooth surface that the closure parts 2 and 3 automatically rotate into each other about the connection axis A when the closing force $F_S$ is applied along the connection axis A. For example, when turning in, a threaded portion 23b with its sliding surface 231 can slide along a sliding surface 321 of an (underlying) threaded portion 32c of the second closure part 3. The static friction at the sliding surfaces 231, 321 of the threaded portions 23a-23c and 32a-32c of the closure parts 2 and 3 is so small that solely due to a comparatively small, manually applied closing force $F_S$ acting along the connection axis A the closure parts 2 and 3 are guided over the sliding surfaces 231, 321 and rotated relative to each other, without a torque having to be applied onto the closure parts 2 and 3.

When the two closure parts 2 and 3 have been turned into each other completely, a closed position of the two closure parts 2 and 3 is given. In this closed position, blocking surfaces 232 and 322 located opposite each other can get in engagement with each other under a (tensile) load $F_B$ which moves the two closure parts 2 and 3 relative to each other along the rotation or connection axis A opposite to the original closing direction. For this purpose, the blocking surfaces 232 and 322 each include latching teeth, via which opposed threaded portions, e.g. a threaded portion 23b of the first closure part 2 and an (overlying) threaded portion 32b of the second closure part 3, can lock into place with each other in the closed position and thus block a rotation of the two closure parts 2 and 3 relative to each other.

Between the two closure parts 2 and 3 a clearance is provided in the closed position, so that the two closure parts 2 and 3 are axially movable relative to each other along the connection axis A. On turning in of the closure part 2, for example, a threaded portion 23b of the first closure part 2 with its sliding surface 231 thus can slide along a sliding surface 321 of a threaded portion 32c of the second closure part 3 adjacent thereto in closing direction. At the same time, however, the first closure part 2 also can be moved axially relative to the second closure part 3 opposite to the closing direction, so that via its toothed blocking surface 232 the same threaded portion 23b blockingly gets in engagement with the blocking surface 322 of a threaded portion 32b, which is adjacent to the threaded portion 23b against the closing direction. In this way, the two closure parts 2 and 3 are prevented from rotating relative to each other, and the closure device 2 is blocked against opening as long as a tensile load is applied at the closure parts 2, 3, for example via belt, rope or leash portions fixed at the handle portions 20, 30. Arresting the two closure parts 2 and 3 is effected within the cavity 311 defined by the sleeve body 31, which in the closed position is bordered by a base part 312 of the second closure part 3 and opposite thereto by the head part 21 along the connection axis A.

As a result, the illustrated closure device 1 thus can be closed in a simple way, in that the two closure parts 2 and 3 are turned into each other along their sliding surfaces by pressure along the connection axis A. During a subsequent tensile load, the two closure parts 2 and 3 lock into place with each other via the blocking surfaces 231 and 321 resting against each other, so that a rotation of the two closure parts 2 and 3 relative to each other is blocked and hence opening of the closure device 1 is prevented.

With FIGS. 2A, 2B and 2C a second exemplary embodiment of a closure device 1' is shown, in which in contrast to the first exemplary embodiment of FIGS. 1A to 1E a second closure part 3' is designed extended and in addition auxiliary closing means in the form of magnets M2 and M3 are provided, in order to support closing of the closure device 1' and have it take place almost automatically, after a first closure part 2' has been attached to the second closure part 3'.

Here as well, the first closure part 2' includes a handle portion 20' and a head part 21'. In the closed position, the head part 21' again closes a cavity 311' within which the connection of the two closure parts 2' and 3' is effected via threaded portions with sliding surfaces and blocking surfaces corresponding to the design variant of FIGS. 1A to 1E. The cavity 311' here takes only a fraction of the volume of the sleeve body 31'.

To support closing of the closure device 1', each closure part 2', 3' here includes a magnet M2 or M3. The two magnets M2 and M3 attract each other and in the present case are arranged in the region of the end faces of the first closure part 2' and second closure part 3' adjacent to each other in the closed position. With a corresponding pitch of the threaded portions formed with the sliding surfaces and blocking surfaces and a sufficiently smooth surface of the sliding surfaces, the first closure part 2' on attachment to the cavity 311' is pulled by the magnets M2, M3 along a connection axis in closing direction towards the second closure part 3' and thereby automatically rotated about the connection axis along the sliding surfaces into the closed position. When a tensile load $F_B$ acts on the closure parts 2' and 3' in the closed position, which moves the closure parts 2', 3' relative to each other against the closing direction, the blocking surfaces get in contact with each other and block the two closure parts 2', 3' against a rotation relative to each other about the connection axis.

With FIGS. 3A to 3F a development of the design variant of FIGS. 1A to 1E is illustrated. As compared to the design variant of FIGS. 1A to 1E, the closure device 1* shown herein includes a modified second closure part 3*. The first closure part 2 is formed correspondingly. In addition, a spring element 4 is provided as pretensioning element—here in the form of a coil spring—, in oder to pretension the two closure parts 2 and 3* in the closed position into a blocking position in which the blocking surfaces 231, 322 of the two closure parts 2, 3* blockingly rest against each other. The spring element 4 here is arranged such that it generates a spring force $F_F$, which counteracts a movement of the two closure parts 2, 3* towards each other and hence acts opposite to the closing direction.

The spring element 4 here is mounted in a central receptacle 3120* in a base part 312* on the sleeve body 31* of the second closure part 3*. The spring element 4 supports on the base part 312* and on an end face 24 of the first closure part 2, when the closure part 2 has been attached to the second closure part 3*.

Via the spring element 4, which must be compressed when the first closure part 2 is turned into the cavity 311 of the sleeve body 31*, it is achieved that the blocking surfaces 232 and 322 of the two closure parts 2, 3* automatically get in engagement with each other, as soon as the first closure part 2 at least slightly has been turned into the second closure part 3* and no more closing force $F_S$ acts on the closure device 1*, which presses the two closure parts 2, 3* towards each other. As a result, the two closure parts 2 and 3* are arrestable and lockable relative to each other against a rotation also outside the completely closed position of the closure device 1" due to the abutment of the blocking surfaces 232 and 322 at each other. Independent of the action of a tensile load $F_B$ it thus is achieved here that the closure parts 2 and 3* are arrested not only in a closed (end) position, in which the two closure parts 2, 3* maximally are approached to each other by deducting a clearance, but also in defined intermediate positions.

In the exemplary embodiment shown in FIGS. 3A to 3F it is achieved via the spring element 4 that the two closure parts 2 and 3* are pressed apart such that the blocking surfaces 232 and 322 of the individual threaded portions blockingly rest against each other as soon as an individual tooth of a blocking surface 232 of the first closure part 2 to be turned in can positively be brought in engagement with a toothed blocking surface 322 of the other, second closure part 3*. When frictional contacts between the blocking surfaces are provided instead of toothed blocking surfaces 232, 322, not only a stepped, but also a stepless arrestment is possible in the individual intermediate positions.

FIGS. 3A and 3B in different views initially show a position of the two closure parts 2 and 3* relative to each other, in which the first closure part 2 just has been attached to the second closure part 3* and its sleeve portion 22 has been put into the cavity 311. FIGS. 3C and 3D show the two closure parts 2 and 3* completely turned into each other, wherein the two closure parts 2 and 3* are pressed towards each other by the closing force $F_S$, so that the blocking surfaces 232 and 322 are not positively connected with each other and the spring element 4 is compressed maximally. FIGS. 3E and 3F then show the closed position in which the blocking surfaces 232, 322 blockingly rest against each other as a result of the spring force $F_F$.

Figure 6A:
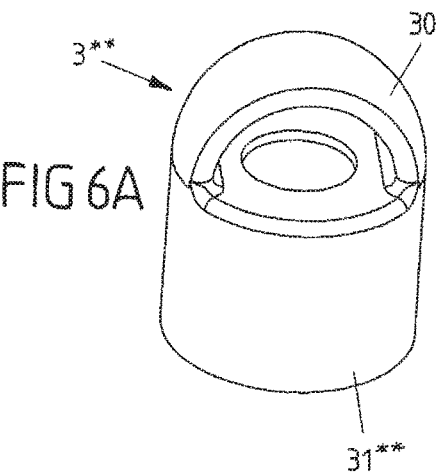
Figure 6C:
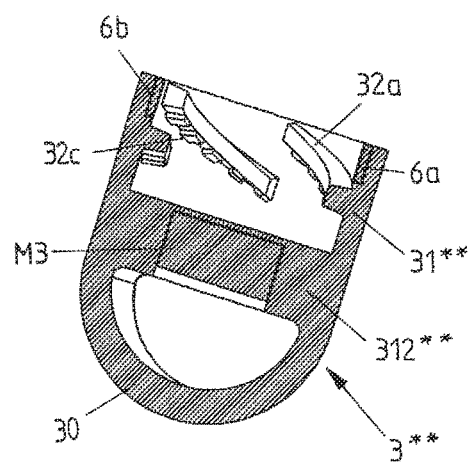
Figure 9C:
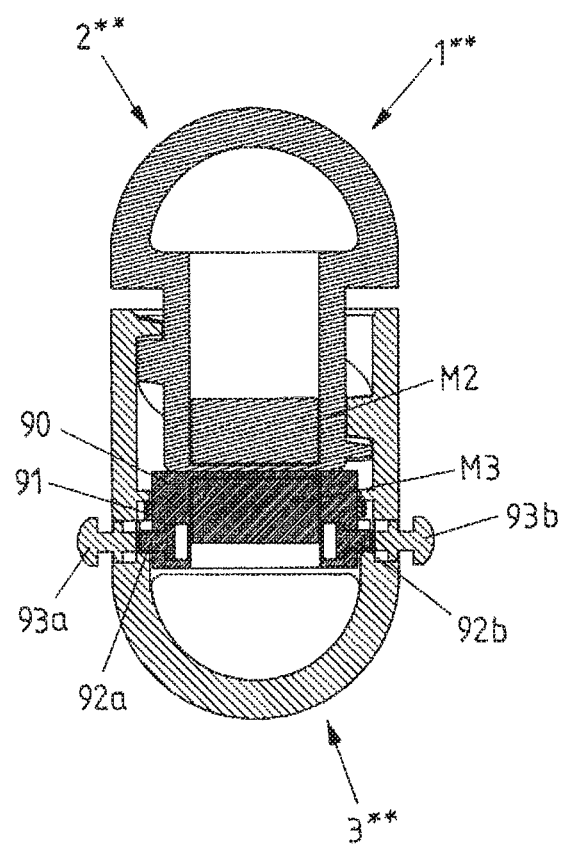
Figure 9D:
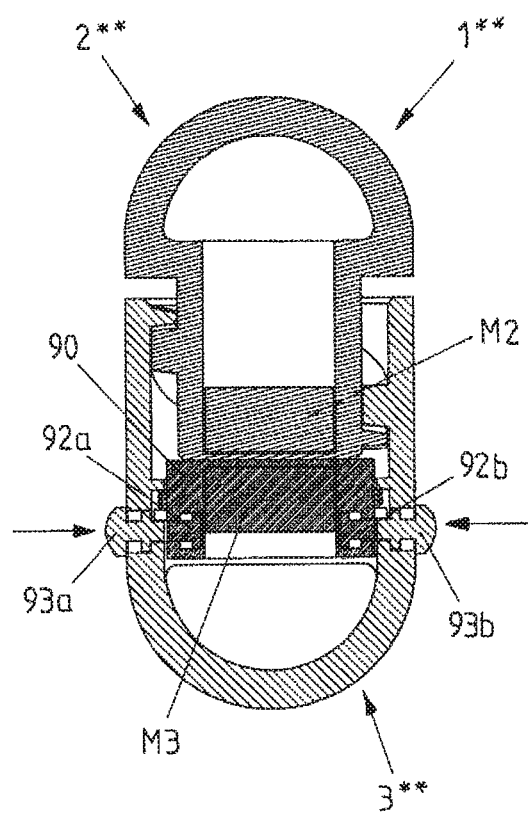

FIGS. 4A to 4C, 5A to 5C and 6A to 6C illustrate a further possible development of the exemplary embodiment of FIGS. 1A to 1C, in which a closure device 1 includes contact elements 5a, 6a, 5b, 6b which in a closed position are connected with each other in an electrically conducting manner. In FIGS. 4A to 4C, the closure device 1 is shown in different views with closure parts 2, 3 turned into each other. FIGS. 5A to 5C show the first closure part 2 individually in different views. FIGS. 6A to 6C in turn show the second closure part 3 in different views.

In correspondence with the exemplary embodiments of FIGS. 1A to 1E and 3A to 3F, the first closure part 2 here again is formed bolt-like and can be turned into a sleeve body 31 of the second closure part 3 by pressurization along sliding surfaces 231, 321 of an internal and external thread and can be blocked against a rotation via blocking surfaces 233, 232 of the internal and external threads at the second closure part 3. In correspondence with the exemplary embodiment of FIGS. 2A to 2C, magnets M2, M3 are provided at the two closure parts 2 and 3, in order to support the automatic turning into each other of the two closure parts 2 and 3 and hence the automatic closing of the closure device 1. The magnets M2, M3 here are arranged in a base part 312 of the sleeve body 31 or at the end of the hollow cylindrical sleeve portion 22 of the first closure part 2 and for example embedded into the (plastic) material of the respective closure part 2, 3**.

Furthermore, contact plates 6a, 6b of an electrically conductive material are arranged on the inner wall of the sleeve body 31 close to the opening via which the sleeve body 22 of the first closure part 2 is introduced into the cavity 311. To these contact plates 6a, 6b two contact pins 5a, 5b of the first closure part 2 are associated. The two contact pins 6a, 6b radially are elastically movably mounted on the sleeve body 22 with respect to the connection axis and radially protrude from the shell surface of the sleeve portion 22. Via a pretensioning means 50 accommodated within the sleeve portion 22—here for example in the form of a coil spring—the two contact pins 5a, 5b are pretensioned against each other, so that the ends of the contact pins 5a, 5b are pressed out of the shell surface of the sleeve portion 22. This ensures a contact of the contact pins 5a, 5b with the contact sheets 6a, 6b, as soon as the two closure parts 2 and 3 have been turned into each other sufficiently and are in the closed position in which the cavity 311 is covered by the head part 21 of the first closure part 2. In this way, a signal indicating that the closed position is taken can be generated in the closed position of the two closure parts 2 and 3 secured against rotation by means of the contact pins 5a, 5b and contact plates 6a, 6b contacting each other. Alternatively or in addition, a signal can be transmitted via the electrically conductive contact pins 5a, 5b and 6a, 6b, for example from a signal line resting against the first closure part 2 to a signal line resting against the second closure part 3".

FIGS. 7A and 7B show a further design variant of a closure device 7 according to the invention, which can be used for example as part of a hose coupling. Via closure parts 71, 72 turned into each other a channel piece K1 of the first closure part 71 is connected with a channel piece K2 of the second closure part 72 in a manner sealed to the outside.

Analogous to the exemplary embodiments explained above, the first closure part 71 with a first connecting region in the form of a sleeve portion 712 also can be turned into a cavity 73 of a second connecting region in the form of a sleeve body 721 of the second closure part 72, in order to connect the two closure parts 71, 72 with each other in the manner of a screw connection and close the closure device 7. Via a seal DR in the form of a circumferential sealing ring, which is arranged between an outer shell surface of the sleeve portion 712 and an inner wall of the sleeve body 721, it is ensured that the two closure parts 71, 72 sealingly rest against each other and a fluidic connection of the channel piece K1 sealed to the outside in the hollow cylindrical sleeve portion 712 with the channel piece K2 is produced in the sleeve body 721 when the closure device 7 is properly closed.

Here as well, easy turning in of the two closure parts 71, 72 is ensured via sliding surfaces 7231 on threaded portions 413a, 713b of the first closure part 71 and sliding surfaces 7231 on threaded portions 723a, 723b of the second closure part 72. At the same time, it is ensured by means of opposed blocking surfaces 7132 on the threaded portions 713a, 713b of the first closure part 71 and blocking surfaces 7232 on the threaded portions 723a, 723b of the second closure part 72 that in a closed position the two closure parts 71, 72 relatively easily can be blocked against a rotation relative to each other.

Analogous to the exemplary embodiment of FIGS. 3A to 3F a spring element 74 is provided, in order to pretension the two closure parts 71, 72 along their connection axis into a blocking position, in which the blocking surfaces 7132 and 7232 blockingly rest against each other. The spring element 74 here supports on a circularly ring-shaped end face 7210 of the second closure part 72 facing the first closure part 71 and on an edge of the head part 711 of the first closure part 71.

A portion of the sleeve body 721 just like the head part 711 can serve as connecting piece for one of two hose ends which sealingly are to be connected with each other via the closure device 7.

FIGS. 8A and 8B show a possible development of the exemplary embodiment of FIGS. 7A and 7B. Corresponding components are designated with a preceding "8" instead of "7". Correspondingly, a closure device 8 of FIGS. 8A and 8B includes a first closure part 81 and a second closure part 82, which can smoothly be turned into each other via threaded portions 813a, 813b and 823a, 823b and are secured against rotation via blocking surfaces 8132, 8232 likewise formed on the threaded portions 813a, 813b and 823a, 823b.

Other than in the exemplary embodiment of FIGS. 7A and 8B, a closure device 8 includes auxiliary closing means in the form of magnets M7, M8, via which the two closure parts 81, 82 are pulled towards each other and into the closed position. Turning in into the closed position thereby is facilitated.

Alternatively, the magnets M7 and M8 accommodated in the closure parts 81 and 82 also can be formed and arranged such that they repel each other. The magnets M7 and M8 hence would generate a pretensioning force, in order to have the blocking surfaces 8132 and 8232 of the two closure parts 81, 82 blockingly rest against each other, without the two closure parts 81, 82 being subjected to a tensile load in their closed position. In any case, however, a closure device 8 also ensures that by means of the blocking surfaces 8132 and 8232 resting against each other a rotation of the two closure parts 81, 82 relative to each other is blocked, when the two closure parts 81, 82 are subjected to a tensile load.

Although in the illustrated Figures blocking surfaces are shown with latching teeth trapezoidal in cross-section, it is of course also possible to provide blocking surfaces with an alternative design, by means of which a frictional and/or positive arrestment of the two closure parts at each other is ensured. For example, a blocking surface with a sawtooth arrangement is regarded as advantageous, since the corresponding closure device thereby always can be closed or pressed shut easily, but under tensile load is secured against opening even more effectively than in the case of latching teeth trapezoidal in cross-section.

Furthermore, it can be advantageous to provide an (adjustably mounted) blocking means by which in the closed position an axial movement of the two closure parts relative to each other can be blocked. By such blocking means the provided clearance between the two closure parts thus can be bridged in the closed position, so that without movement of the blocking means the two closure parts no longer can axially be moved relative to each other such that their blocking surfaces no longer rest against each other. By such blocking means, an anti-rotation protection by means of the blocking surfaces resting against each other thus is secured additionally.

Such blocking means can be formed actuatable, so that it can selectively be shifted between a blocking and a release position, wherein the blocking means in its blocking position blocks the axial movability of the two closure parts relative to each other and in its release position permits such axial movability.

FIGS. 9A to 9D show a development of a closure device 1\*\* based on the exemplary embodiment of FIGS. 4A to 6C, in which blocking means are provided, in order to block an axial movement of the two closure parts 2\*\* and 3\*\* in the closed position and thereby provide an easily operable high-security closure.

In contrast to the exemplary embodiment of FIGS. 4A to 6C, a housing 90 for the magnet M3 shiftably mounted within the sleeve body 31\*\* of the second closure part 3\*\* and along the connection axis A is provided at the second closure part 3\*\*. The shiftably mounted housing 90 together with latching pins 93*a*, 93*b* forms a blocking means of a blocking device 9. The housing 90 is shiftable by the clearance defined between the two closure parts 2\*\* and 3\*\* in the closed position or by an adjustment path (almost) corresponding therewith, so that the housing 90 can be shifted in direction of the first closure part 2\*\* turned in, in order to bridge the clearance between the two closure parts 2\*\* and 3\*\*.

The housing 90 furthermore is pretensioned opposite to the closing direction via a spring element 91 within the second closure part 3\*\*. Via the spring element 91 the housing 90 thus is urged away from the first closure part 2\*\* into a release position. In the present case, the spring element 91 is formed as coil spring which on the one hand supports on a shoulder of the inner wall of the sleeve body 31\*\* and on the other hand on the housing 90. Triggered by the magnets M2 and M3 of the two closure parts 2\*\* and 3\*\*, shifting of the housing 90 with the magnet M3 located therein is effected in the closed position in direction of the first closure part 2\*\* turned in against the restoring force of the spring element 91.

Latching pins 92*a* and 92*b* furthermore are adjustably mounted on the housing 91. These latching pins 92*a* and 92*b* are radially adjustable with respect to the connection axis A and radially pretensioned to the outside. It is provided that due to their pretension the latching pins 92*a* and 92*b* automatically snap into latching openings on the inner wall of the sleeve body 31\*\*, when as a result of the magnetic force applied via the two magnets M2 and M3 the housing 91 has been shifted in direction of the first closure part 2\*\* into a blocking position to such an extent that a clearance between the two closure parts 2\*\* and 3\*\* is overcome. Via the housing 90 latched in its blocking position by means of the latching pins 92*a* and 92*b*, an axial movement of the two closure parts 2\*\* and 3\*\* towards each other along the connection axis A is blocked. The blocking surfaces 232 and 322 of the threaded portions of the two closure parts 2\*\* and 3\*\* thus remain in contact and cannot be unblocked by pressing the closure device 1\*\* together.

Via actuating elements 93*a* and 93*b* operable on the outer wall of the sleeve body 31\*\*, the latching pins 92*a* and 92*b* can again be brought out of engagement with the respectively associated latching openings, so that the housing 90 again is axially shiftable and the blockage between the two closure parts 2\*\* and 3\*\* can be released.

In the illustrated design variant, the first closure part 2\*\* thus can be moved along the sliding surfaces 231 and 221 and with the support of the magnets M2 and M3 can easily be turned into the second closure part 3\*\*. After reaching the closed position, the second closure part 2\*\* can move relative to the second closure part 3\*\* by the provided clearance already under a slight tensile load, so that the blocking surfaces 232 and 322 blockingly get in engagement with each other and secure the two closure parts 2\*\* and 3\*\* against a rotation relative to each other. During this movement into the defined blocking position by the blocking abutment of the blocking surfaces 232 and 322 against each other, the shiftably mounted housing 90 is entrained as a result of the magnetic forces between the magnets M2 and M3. The housing 90 thus is transferred from a release position into a blocking position. In the blocking position, the latching pins 92*a* and 92*b* then can snap into place and arrest the housing 90 in its blocking position in which the housing 90 prevents that the blockage of the two closure parts 2\*\* and 3\*\* via the blocking surfaces 232 and 322 resting against each other can be released.

For opening the closure device 1\*\*, the closure device 1\*\* first must be relieved, i.e. no more tensile force must act for example on the first closure part 2\*\*. By actuating the actuating elements 93*a* and 93*b*, the arrestment of the housing 90 then can be released via its latching pins 92*a* and 92*b*. Via the spring element 91, the housing 90 then is moved back into its release position. By pressing the first closure part 2\*\* in direction of the second closure part 3\*\* along the connection axis A, the blockage via the blocking surfaces 232 and 322 now can be released and the closure device 1\*\* can be opened by turning the first closure part 2\*\* out of the second closure part 3\*\*.

With the illustrated design variant an easily operable high-security closure can be provided, in which by defined positions of the shiftably mounted housing 90 of the second closure part 3\*\* a closed position is effectively and possibly visibly and audibly secured against inadvertent opening of the closure with the magnet M3 and yet can be opened again in a simple way.

On the actuating elements 93*a* and 93*b* a color coding furthermore can be provided to visually perceptibly indicate to a user of the closure device **1\*\* when the housing 90 of the blocking device 9** is in the blocking position and arrested.

Alternatively or in addition it can be provided that by taking the blocking position an electrical signal is triggered, for example via the pretensioned latching pins 92*a*, 92*b* which then strike against a counter contact or switch.

In FIGS. 10A to 10E a further design variant of a closure device 1 according to the invention is illustrated, in which the two closure parts 2, 3 each form blocking surfaces 232, 322 and sliding surfaces 231.1, 321.1 on spaced latching webs 233 or 323 of a first segmented threaded portion 23*a*1, 23*b*1, 23*c*1, 23*d*1 or 32*a*1, 32*b*1, 32*c*1, 32*d*1 and each merely one sliding surface 231.2 and 321.2 on a second longitudinally extending threaded portion 23*a*2, 23*b*2, 23*c*2, 23*d*2; 32*a*2, 32*b*2, 32*c*2, 32*d*2 following in circumferential direction. The sliding surfaces 231.1, 231.2 and 321.1, 321.2 of the different types of threaded portions 23*a*1/23*a*2, 23*b*1/23*b*2, 23*c*1/23*c*2, 23*d*1/23*d*2 and 32*a*1/32*a*2, 32*b*1/32*b*2, 32*c*1/32*c/*, 32*d*1/32*d*1 of a closure part 2 or 3 lie one beside the other along a helix around the sleeve portion 22 or the sleeve body 31 and with closure parts 2, 3 properly connected with each other face the sliding surfaces 321.1, 321.2 and 231.1, 231.2 of the respective other closure part 3, 2**.

In the variant of FIGS. 10A to 10E, each closure part 2, 3 includes several (in the present case four each) threaded segments spatially spaced from each other along the respective connecting region 22 or 31, which each consist of a pair of first and second threaded portions 23*a*1/23*a*2, 23*b*1/23*b*2, 23*c*1/23*c*2, 23*d*1/23*d*2 and 32*a*1/32*a*2, 32*b*1/32*b*2, 32*c*1/32*c*2, 32*d*1/32*d*2. A first threaded portion 23*a*1, 23*b*1, 23*c*1, 23*d*1 or 32*a*1, 32*b*1, 32*c*1, 32*d*1 each is formed by latching webs 233 or 323 separated from each other and protruding radially with respect to the connection axis A. Between a pair of latching webs 233 or 323 of a closure part 2, 3 a latching opening 234 or 324 each is formed. On opposite (upper and lower) sides of the latching webs 233 and 323 on the one hand sliding surfaces 231.1 or 321.1 (on a first side) and on the other hand blocking surfaces 322 (on an opposite second side) are defined. A threaded portion 23*a*2, 23*b*2, 23*c*2, 23*d*2 or 32*a*2, 32*b*2, 32*c*2, 32*d*2 of a threaded segment each adjoining the first threaded portion 23*a*1, 23*b*1, 23*c*1, 23*d*1 or 32*a*1, 32*b*1, 32*c*1, 32*d*1 with its latching webs 233 or 323 on the other hand merely on one side forms a sliding surface 231.2 or 321.2.

Figure 10A:
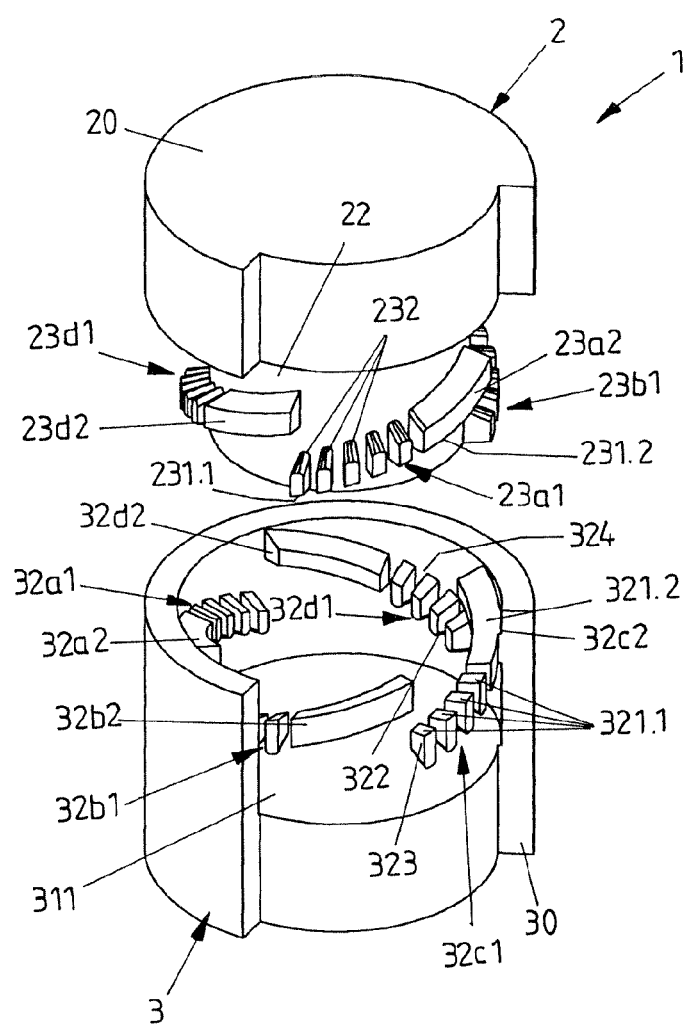
Figure 10C:
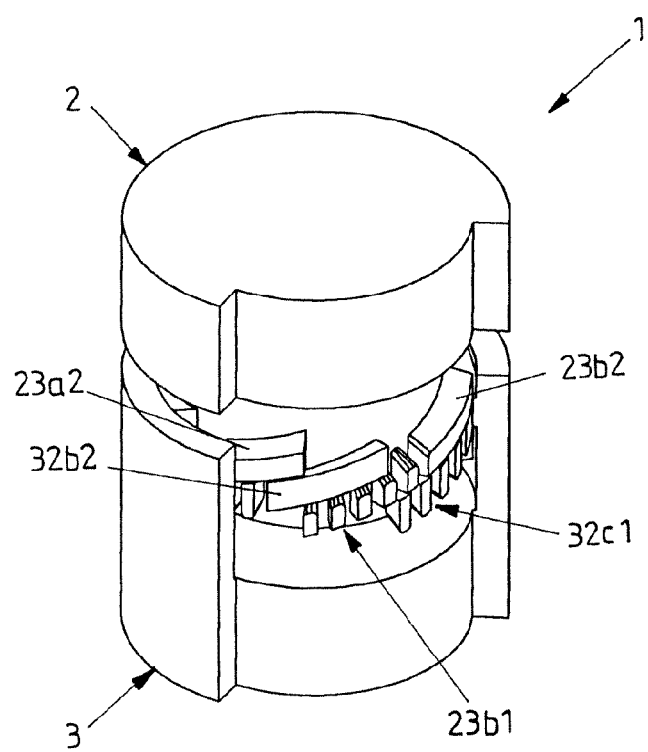
Figure 10D:
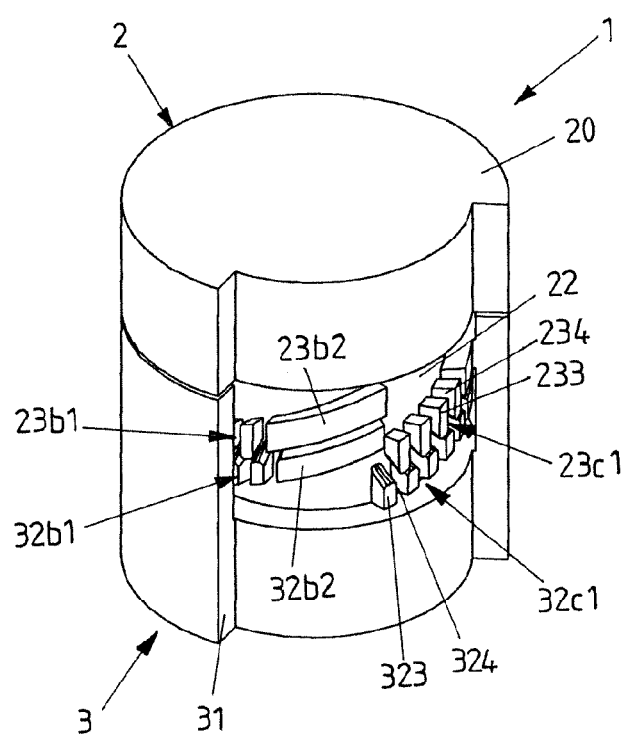
Figure 10E:
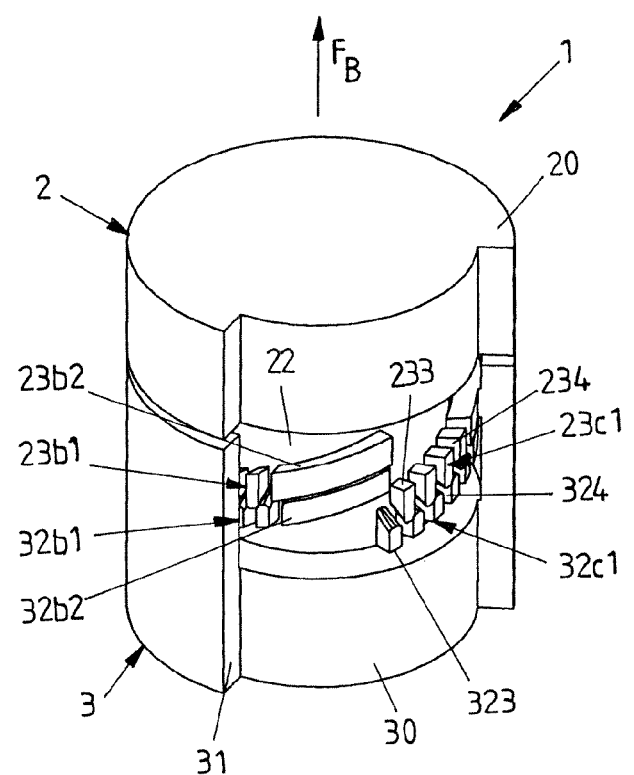

The sliding surfaces 231.1, 231.2 of the first closure part 2 and the sliding surfaces 321.1, 321.2 of the second closure part in the present case again facilitate closing of the closure device 1 when for example the first closure part 2 is turned into the second closure part 3 in the manner of a screw connection. The threaded segments of the two closure parts 2, 3 slide along each other on their different sliding surfaces 231.1, 231.2 and 321.1, 321.2. When the closed position as shown in FIG. 10E has been reached, the first threaded portions 23*a*1, 23*b*1, 23*c*1, 23*d*1; 32*a*1, 32*b*1, 32*c*1, 32*d*1 of the two closure parts 2, 3 including the several latching webs 233 and 323 face each other such that under an oppositely directed load $F_B$ (upwards in FIGS. 10A to 10E) the latching webs 233, 323 and latching openings 324, 234 can positively get in engagement with each other and thereby block a rotation of the two closure parts 2, 3 relative to each other.

Latching of the latching webs 233, 323 of the two closure parts 2, 3 with latching openings 324, 234 of the respective other closure part 3, 2 defined between these latching webs 233, 323 however is excluded during the transfer into the closed position. Although the respective latching webs 233, 323 temporarily are located opposite latching openings 324, 234 of the other closure part 3, 2, with an applied closing force $F_S$ by which the closure parts 2, 3 are pressed towards each other, it always is ensured via the second threaded portions 23*a*2 23*b*2, 23*c*2, 23*d*2; 32*a*2, 32*b*2, 32*c*2, 32*d*2 of the two closure parts, which rest against each other and are formed to extend in longitudinal direction, that the latching webs 233, 323 cannot get in engagement with the latching openings 324, 234 of the respective other closure part 3, 2 in direction of action of the closing force $F_S$ (downwards in FIGS. 10 to 10E).

In this design variant, too, the two closure parts 2, 3 in their closed position moreover selectively are axially adjustable relative to each other along the connection axis A due to the incorporated clearance, in order to release a blockage via the meshing blocking surfaces 232 and 322. In this way, the one closure part 2 or 3 can again be rotated out of the closed position relative to the other closure part 3 or 2 by pressing the two closure parts 2 and 3 together, wherein then the respective sliding surfaces 231.1, 231.2 and 321.1, 321.2 also are again brought in contact with each other.

Other than in the variants shown in the Figures, in which the closure parts must be pressed towards each other in a first loading direction by a resultant external force $F_S$, in order to be turned into each other, and a blocking effect against rotation under an external force $F_B$ into an opposite loading direction is ensured, a reverse configuration is of course also possible. It would be possible, for example, that pulling is necessary on turning in, for example against the compressive force of a spring, and under a pressure load blockage against a rotation is achieved via the blocking surfaces. A possible field of application for this would be leveling feet, for example.

A closure device according to the invention for example can be designed as part of a dog leash, a hose coupling, a camera lens or a carrying handle. For example belt, rope or leash portions thus can effectively be connected with each other via the closure device, wherein in use opening of the closure device definitely is excluded, since the closure parts are subjected to a tensile load.

LIST OF REFERENCE NUMERALS 1, 1', 1\*, 1\*\* closure device
2, 2', 2\*\* 1st closure part
20, 20' handle portion
21, 21' head part
22, 22\*\* sleeve portion (1st connecting region)
220\*\* bearing hole
231, 231.1, 231.2 sliding surface
232 blocking surface
23*a*, 23*b*, 23*c*, 23*d* threaded portion
23*a*1, 23*b*1, 23*c*1, 23*d*1 1st threaded portion (of a threaded segment)
23*a*2, 23*b*2, 23*c*2, 23*d*2 2nd threaded portion (of a threaded segment)
233 latching web
234 latching opening
24 end face
3, 3', 3\*, 3\*\* 2nd closure part
30 handle portion
31, 31', 31\* sleeve body (2nd connecting region)

310 end face
311, 311' cavity
312, 312*, 312** base part
3120* receptacle
321, 321.1, 321.2 sliding surface
322 blocking surface
32a, 32b, 32c threaded portion
323 latching web
324 latching opening
32a1, 32b1, 32c1, 32d1 1st threaded portion (of a threaded segment)
32a2, 32b2, 32c2, 32d2 2nd threaded portion (of a threaded segment)
4 spring element (pretensioning element)
50 pretensioning means
5a, 5b contact pin
6a, 6b contact plate
7 closure device
71 1st closure part
711 head part/connecting piece
712 sleeve portion (1st connecting region)
7131 sliding surface
7132 blocking surface
713A, 713b 1st threaded portion
72 2nd closure part
721 sleeve body (2nd connecting region)
7210 end face
7231 sliding surface
7232 blocking surface
723a, 723b 2nd threaded portion
73 cavity
74 spring element
8 closure device
81 1st closure part
811 head part/connecting piece
812 sleeve portion (1st connecting region)
8131 sliding surface
8132 blocking surface
813a, 813b 1st threaded portion
82 2nd closure part
821 sleeve body (2nd connecting region)
8231 sliding surface
8232 blocking surface
823a, 823b 2nd threaded portion
83 cavity
A rotation/connection axis
D direction of rotation
DR seal
$F_B$ load
$F_F$ spring force
$F_S$ closing force
K1, K2 channel piece
M2, M3, M7, M8 magnet (auxiliary closing means)
α pitch angle
9 blocking device
90 housing
91 spring element
92a, 92b latching pin
93a, 93b actuating element

The invention claimed is:
1. A closure device, comprising
a first closure part which includes at least one first connecting region, and
a second closure part which includes at least one second connecting region,
wherein
for closing the closure device, the first closure part is attachable to the second closure part along a connection axis and, by rotation about the connection axis, is movable relative to the second closure part into a closed position, and
in the closed position, the two closure parts are held against each other via their connecting regions,
wherein
the connecting regions each include at least one sliding surface and at least one blocking surface formed on a threaded portion such that the closure parts are rotatable relative to each other along their sliding surfaces about the connection axis into the closed position, when a force acts on the two closure parts along the connection axis in a first loading direction, and
a rotation of the two closure parts relative to each other about the connection axis is blocked by the blocking surfaces resting against each other, when a force acts on the two closure parts along the connection axis in a second loading direction opposite to the first loading direction,
wherein, in the closed position, the closure parts are axially movable relative to each other by a defined clearance with respect to the connection axis, so that a blockage via the blocking surfaces resting against each other is released and the sliding surfaces can be brought in contact with each other,
wherein at least one sliding surface is formed on a threaded portion of the respective connecting region,
wherein the threaded portion is formed with the at least one sliding surface such that via the sliding surfaces of the closure parts resting against each other the closure parts are rotated relative to each other into the closed position, when the two closure parts are pressed towards each other by external forces along the connection axis and wherein the two closure parts are configured for an arrestment in different intermediate positions relative to each other via the blocking surfaces of the closure parts, and
at least one auxiliary closing means is provided, which exerts a force that supports the movement of the two closure parts in direction of the closed position, wherein the at least one auxiliary closing means comprises a magnet which exerts a magnetic force that supports pressing of the two closure parts towards each other.

2. The closure device according to claim 1, wherein the at least one sliding surface and the at least one blocking surface are formed on opposite sides of the threaded portion of the respective connecting region.

3. The closure device according to claim 1, wherein the pitch of the threaded portion with the at least one sliding surface is chosen greater than 10° and/or the at least one sliding surface has a smooth surface.

4. The closure device according to claim 1, wherein the threaded portion of at least one connecting region has an interrupted thread with several threaded portions following each other in a circumferential direction about the connection axis.

5. The closure device according to claim 2, wherein at least one connecting region has an interrupted thread with several threaded portions following each other in a circumferential direction about the connection axis and wherein
on a first threaded portion of at least one closure part at least one sliding surface and at least one blocking surface are formed on opposite sides of the threaded portion, and on a second threaded portion of this closure part, which follows the first threaded portion in circumferential direction, merely one second sliding surface is formed.

6. The closure device according to claim 1, wherein the blocking surfaces can frictionally and/or positively rest against each other, in order to block a rotation of the two closure parts relative to each other.

7. The closure device according to claim 6, wherein the blocking surfaces can be brought in engagement with each other via a toothing, in order to block a rotation of the two closure parts relative to each other.

8. The closure device according to claim 6, wherein on a closure part several blocking surfaces are formed on latching webs spaced from each other and protruding radially—with respect to the connection axis and these latching webs can be brought in engagement with latching openings, which are defined by blocking surfaces of the other closure part.

9. The closure device according to claim 5, wherein on a closure part several blocking surfaces are formed on latching webs spaced from each other and protruding radially—with respect to the connection axis—and these latching webs can be brought in engagement with latching openings, which are defined by blocking surfaces of the other closure part, wherein the latching webs are part of the first threaded portion and on a first side form parts of the blocking surfaces and on an opposite second side each form a sliding surface.

10. The closure device according to claim 8, wherein on both closure parts blocking surfaces are formed on latching webs and a latching opening each is defined between a pair of latching webs of a closure part.

11. The closure device according to claim 9, wherein on both closure parts blocking surfaces are formed on latching webs and a latching opening each is defined between a pair of latching webs of a closure part, wherein the first closure part with its first threaded portions including the latching webs and the second closure part with its first threaded portions including the latching webs are formed and adjusted to each other such that on rotation into the closed position the sliding surfaces, which are formed on the latching webs of the first closure part, do not get in contact with the sliding surfaces which are formed on the latching webs of the second closure part.

12. The closure device according to claim 1, wherein at least one pretensioning element is provided, by which in the closed position the two closure parts are pretensioned into a blocking position in which the blocking surfaces blockingly rest against each other.

13. The closure device according to claim 12, wherein the at least one pretensioning element generates a pretensioning force which counteracts pressing of the two closure parts towards each other.

14. The closure device according to claim 1, wherein the first closure part includes at least one first contact element and the second closure part includes at least one second contact element, wherein, in the closed position, the two contact elements are in contact with each other in an electrically conducting manner.

15. The closure device according to claim 1, wherein at least one blocking means is provided, by which, in the closed position, an axial movement of the two closure parts relative to each other is blocked.

16. A closure device comprising:
a first closure part which includes at least one first connecting region, and a second closure part which includes at least one second connecting region, wherein
for closing the closure device, the first closure part is attachable to the second closure part along a connection axis and, by rotation about the connection axis, is movable relative to the second closure part into a closed position, and
in the closed position, the two closure parts are held against each other via their connecting regions,
wherein the connecting regions each include at least one sliding surface and at least one blocking surface such that
the closure parts are rotatable relative to each other along their sliding surfaces about the connection axis into the closed position, when a force acts on the two closure parts along the connection axis in a first loading direction, and
a rotation of the two closure parts relative to each other about the connection axis is blocked by the blocking surfaces resting against each other, when a force acts on the two closure parts along the connection axis in a second loading direction opposite to the first loading direction,
wherein, in the closed position, the closure parts are axially movable relative to each other by a defined clearance with respect to the connection axis, so that a blockage via the blocking surfaces resting against each other is released and the sliding surfaces can be brought in contact with each other,
at least one auxiliary closing means is provided, which exerts a force that supports the movement of the two closure parts in direction of the closed position, wherein the at least one auxiliary closing means comprises a magnet which exerts a magnetic force that supports pressing of the two closure parts towards each other, and
wherein the closure device is part of a dog leash, a camera lens, or a carrying handle.

17. The closure device according to claim 16, wherein a sliding surface and/or a blocking surface is formed on a threaded portion of the respective connecting region.

18. The closure device according to claim 16, wherein a threaded portion is formed with a sliding surface such that via sliding surfaces of the closure parts resting against each other the closure parts are rotated relative to each other into the closed position, when the two closure parts are pressed towards each other by external forces along the connection axis.

19. The closure device according to claim 16, wherein at least one auxiliary closing means is provided as a magnet, which exerts a magnetic force that supports the movement of the two closure parts in direction of the closed position.

20. A closure device, comprising:
a first closure part which includes at least one first connecting region, and
a second closure part which includes at least one second connecting region,
wherein
for closing the closure device, the first closure part is attachable to the second closure part along a connection axis and, by rotation about the connection axis, is movable relative to the second closure part into a closed position, and
in the closed position, the two closure parts are held against each other via their connecting regions,
wherein
the connecting regions each include at least one sliding surface and at least one blocking surface formed on a threaded portion such that the closure parts are rotatable relative to each other along their sliding surfaces about the connection axis into the closed position, when a force acts on the two closure parts along the connection axis in a first loading direction, and a rotation of the two closure parts relative to each other about the connection axis is blocked by the blocking surfaces resting against each other, when a force acts on the two closure parts along the connection axis in a second loading direction opposite to the first loading direction, wherein, in the closed position, the closure parts are axially movable relative to each other by a defined clearance with respect to the connection axis, so that a blockage via the blocking surfaces resting against each other is released and the sliding surfaces can be brought in contact with each other, wherein the threaded portion is formed with the at least one sliding surface such that via the sliding surfaces of the closure parts resting against each other the closure parts are rotated relative to each other into the closed position, when the two closure parts are pressed towards each other by external forces along the connection axis and the two closure parts are configured for an arrestment in different intermediate positions relative to each via the blocking surfaces of the closure parts, at least one auxiliary closing means is provided, which exerts a force that supports the movement of the two closure parts in direction of the closed position, wherein the at least one auxiliary closing means comprises a magnet which exerts a magnetic force that supports pressing of the two closure parts towards each other, and the first closure part includes at least one first contact element and the second closure part includes at least one second contact element, wherein in the closed position the two contact elements are in contact with each other in an electrically conducting manner.

* * * * *

UNITED STATES PATENT AND TRADEMARK OFFICE
CERTIFICATE OF CORRECTION

PATENT NO. : 10,383,409 B2
APPLICATION NO. : 14/903855
DATED : August 20, 2019
INVENTOR(S) : Joachim Fiedler Page 1 of 1

It is certified that error appears in the above-identified patent and that said Letters Patent is hereby corrected as shown below:

In the Specification

Column 1, Line 9, delete "Jul. 1," and insert -- Jul. 11, --

Signed and Sealed this
Nineteenth Day of November, 2019

Andrei Iancu
*Director of the United States Patent and Trademark Office*